(12) United States Patent
Asano et al.

(10) Patent No.: US 10,900,426 B2
(45) Date of Patent: Jan. 26, 2021

(54) CONTROL DEVICE

(71) Applicant: HITACHI AUTOMOTIVE SYSTEMS, LTD., Hitachinaka (JP)

(72) Inventors: Seiji Asano, Ibaraki (JP); Yoshihiko Akagi, Ibaraki (JP); Shinya Matohara, Ibaraki (JP); Kazuhiro Oryoji, Tokyo (JP); Kunihiko Suzuki, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 195 days.

(21) Appl. No.: 16/069,027

(22) PCT Filed: Jan. 10, 2017

(86) PCT No.: PCT/JP2017/000373
§ 371 (c)(1),
(2) Date: Jul. 10, 2018

(87) PCT Pub. No.: WO2017/130675
PCT Pub. Date: Aug. 3, 2017

(65) Prior Publication Data
US 2020/0109673 A1    Apr. 9, 2020

(30) Foreign Application Priority Data
Jan. 27, 2016    (JP) ................................ 2016-012933

(51) Int. Cl.
*F02D 41/00*    (2006.01)
*F02D 9/02*    (2006.01)
(Continued)

(52) U.S. Cl.
CPC ........... *F02D 41/0007* (2013.01); *F02D 9/02* (2013.01); *F02D 41/0052* (2013.01);
(Continued)

(58) Field of Classification Search
CPC ............. F02D 41/0002; F02D 41/0007; F02D 41/0052; F02D 41/187; F02D 9/02;
(Continued)

(56) References Cited

U.S. PATENT DOCUMENTS

| | | |
|---|---|---|
| 5,448,978 A | 9/1995 | Hasegawa et al. |
| 6,152,118 A | 11/2000 | Sasaki et al. |

(Continued)

FOREIGN PATENT DOCUMENTS

| | | |
|---|---|---|
| JP | H05-52625 A | 3/1993 |
| JP | H05-346336 A | 12/1993 |

(Continued)

OTHER PUBLICATIONS

International Search Report with English translation and Written Opinion issued in corresponding application No. PCT/JP2017/000373 dated May 9, 2017.

*Primary Examiner* — Brandon D Lee
(74) *Attorney, Agent, or Firm* — Foley & Lardner LLP

(57) ABSTRACT

An object is to provide a control device that calculates an intake pipe pressure of an engine, in which the humidity of air is measured, and a change in a gas constant due to a change in the total number of moles of air is corrected, to improve the accuracy of the calculation value of the intake pipe pressure.

A control device that controls an engine provided with an air amount measurement unit that measures an air amount passing through a throttle throttle valve provided in an intake passage of the engine, and a humidity measurement unit that measures a humidity of air passing through the throttle throttle valve, includes: an air amount calculation unit that calculates an air amount flowing into a cylinder of the engine based on a measurement result of the air amount measurement unit; and a pressure calculation unit that calculates a pressure of the intake manifold on a downstream (Continued)

side of the throttle throttle valve based on the air amount measured by the air amount measurement unit, the air amount calculated by the air amount calculation unit, and the humidity measured by the humidity measurement unit.

17 Claims, 17 Drawing Sheets

(51) Int. Cl.
   *F02D 41/18*   (2006.01)
   *G01F 1/696*   (2006.01)
   *G01F 15/02*   (2006.01)
   *G05D 16/20*   (2006.01)

(52) U.S. Cl.
   CPC ........... *F02D 41/187* (2013.01); *G01F 1/696* (2013.01); *G01F 15/02* (2013.01); *G05D 16/2013* (2013.01); *F02D 2200/0408* (2013.01); *F02D 2200/0414* (2013.01); *F02D 2200/0418* (2013.01)

(58) Field of Classification Search
   CPC ........... F02D 13/0219; F02D 2041/001; F02D 2200/0402; F02D 2200/0404; F02D 2200/0408; F02D 2200/0414; F02D 2200/0418; F02P 5/045; G01F 1/696; G01F 15/02; G01F 1/68; G05D 16/2013
   See application file for complete search history.

(56) References Cited

U.S. PATENT DOCUMENTS

| | | |
|---|---|---|
| 6,581,447 B1 | 6/2003 | Strohrmann et al. |
| 2003/0136390 A1* | 7/2003 | Ramamurthy ......... F02M 26/05 123/568.22 |
| 2005/0021218 A1 | 1/2005 | Bhargava et al. |
| 2011/0072894 A1* | 3/2011 | Saito ..................... G01F 15/02 73/114.34 |
| 2015/0047340 A1* | 2/2015 | Ulrey ................... F02D 41/0047 60/600 |
| 2015/0101327 A1* | 4/2015 | Clark ................... F02D 41/2445 60/599 |
| 2016/0177848 A1* | 6/2016 | Surnilla .................... F02D 9/02 701/103 |

FOREIGN PATENT DOCUMENTS

| | | |
|---|---|---|
| JP | H06-74076 A | 3/1994 |
| JP | H10-2772 A | 1/1998 |
| JP | 2908924 B2 | 4/1999 |
| JP | 2000-110670 A | 4/2000 |
| JP | 2001-509854 A | 7/2001 |
| JP | 2005-042731 A | 2/2005 |
| JP | 2006-343136 A | 12/2006 |
| JP | 2015-078637 A | 4/2015 |

\* cited by examiner

CONTROL DEVICE

TECHNICAL FIELD

The present invention relates to a control device for an engine.

BACKGROUND ART

The conventional technique of the present invention is calculated by using an ideal gas state equation $P \cdot V = M \cdot R \cdot T$ to calculate an intake pipe pressure. P is an intake pipe pressure, V is an intake pipe volume, M is the mass of air in an intake pipe, R is a gas constant, and T is a gas temperature in the intake pipe. Although an ideal gas state equation is also used in the present application, a related art did not take into account the change in the gas constant R due to the humidity change of the number of moles of air.

CITATION LIST

Patent Literature

PTL 1: Japanese Patent No. 2908924

SUMMARY OF THE INVENTION

Technical Problem

An object of the present invention is to provide a control device that calculates an intake pipe pressure of an engine, in which the humidity of air is measured, and a change in a gas constant due to a change in the total number of moles of air is corrected, to improve the accuracy of the calculation value of the intake pipe pressure.

Solution to Problem

In order to solve the above-mentioned problem, the present invention provides a control device that controls an engine provided with an air amount measurement unit that measures an air amount passing through a throttle throttle valve provided in an intake passage of the engine, and a humidity measurement unit that measures a humidity of air passing through the throttle throttle valve, the control device including: an air amount calculation unit that calculates an air amount flowing into a cylinder of the engine based on a measurement result of the air amount measurement unit; and a pressure calculation unit that calculates a pressure of the intake manifold on a downstream side of the throttle throttle valve based on the air amount measured by the air amount measurement unit, the air amount calculated by the air amount calculation unit, and the humidity measured by the humidity measurement unit.

Advantageous Effects of Invention

Since the gas constant R for calculating the intake pipe pressure is corrected in consideration of the humidity, it is possible to increase the accuracy of the intake pipe pressure calculation value at the time of atmospheric humidity change.

The problems, configurations, and effects other than those described above will be clarified from the description of the embodiments below.

DESCRIPTION OF EMBODIMENTS

An embodiment of the present invention will be described below with reference to the drawings.

Embodiment

Figure 1:
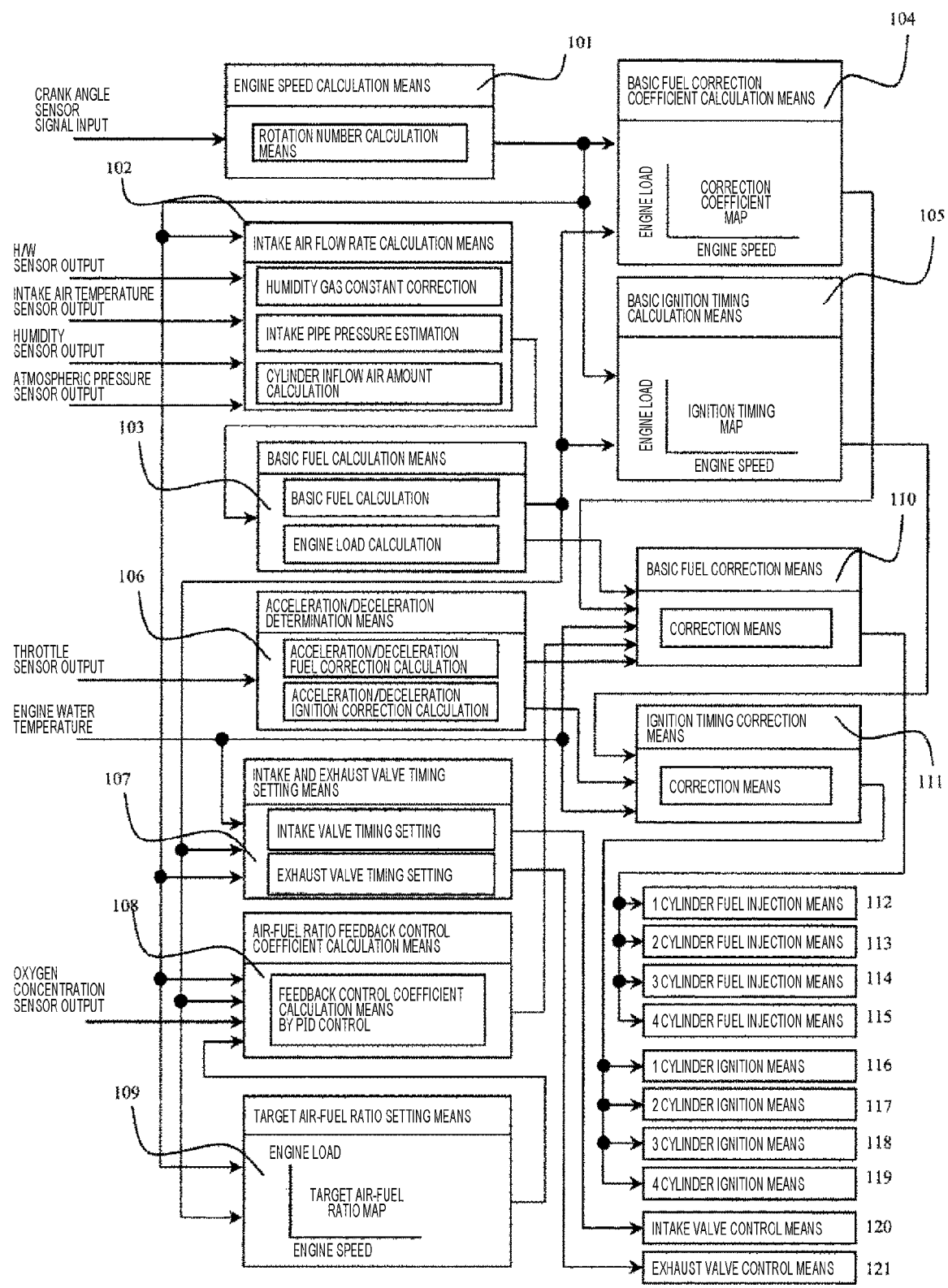
FIG. 1 is an example of a control block of an engine control device including a method for calculating an intake pipe pressure of an engine according to the present invention.

An embodiment of the present invention will be described below with reference to the drawings. FIG. 1 is an example of a control block of an engine control device including a method for calculating an intake pipe pressure of an engine according to the present embodiment. Engine speed calculation means 101 calculates an engine speed per unit time of the engine by counting an electrical signal of a crank angle sensor set at a predetermined crank angle position of the engine, mainly the number of inputs per unit time of a pulse signal change, and performing arithmetic processing. Intake air amount calculation means 102 calculates an intake pipe pressure calculation value at an H/W sensor output, an intake air temperature sensor output, a humidity sensor output, an atmospheric pressure sensor output, and the engine speed, and calculates the air amount flowing into a cylinder of the engine using the intake pipe pressure calculation values. Basic fuel calculation means 103 calculates basic fuel and engine load indices required by the engine in each region based on the engine speed calculated by the engine speed calculation means 101 and the air amount flowing into the cylinder of the engine. Basic fuel correction coefficient calculation means 104 calculates correction coefficients in the respective operation regions of the engine of the basic fuel calculated by the basic fuel calculation means 103 based on the engine speed and engine load calculated by the engine speed calculation means 101, Basic ignition timing calculation means 105 determines optimal ignition timing in each region of the engine by map searching or the like based on the engine speed and the engine load. Acceleration/deceleration determination means 106 makes a transition determination of the engine from the throttle opening degree, and calculates acceleration/deceleration fuel correction and acceleration/deceleration display correction amount accompanying the transition. Intake and exhaust valve timing setting means 107 is a block for determining opening and closing timing of the intake and exhaust valves optimum for the engine, based on the engine speed and engine load calculated by the engine speed calculation means 101.

Air-fuel ratio feedback control coefficient calculation means 108 calculates an air-fuel ratio feedback control coefficient so that a mixture of fuel and air supplied to the engine is maintained at a target air-fuel ratio described later, from the output of an oxygen concentration sensor set in an exhaust pipe of the engine. It should be noted that although the oxygen concentration sensor described above outputs a signal proportional to an exhaust air-fuel ratio in the present embodiment, an exhaust gas may output two signals on a rich side and/or a lean side with respect to a stoichiometric air-fuel ratio.

Target air-fuel ratio setting means 109 determines optimal target air-fuel ratio in each region of the engine by map searching or the like based on the engine speed and the engine load. The target air-fuel ratio determined in this block is used for air-fuel ratio feedback control of the air-fuel ratio feedback control coefficient calculation means 108. The target air-fuel ratio setting means 109 performs correction based on a basic fuel correction coefficient of the basic fuel correction coefficient calculation means 104, an acceleration/deceleration fuel correction amount of the acceleration/deceleration determination means 106, and an air-fuel ratio feedback control coefficient of the air-fuel ratio feedback control coefficient calculation means 108, on the basic fuel calculated by the basic fuel calculation means 103. Ignition timing correction means 111 performs correction at the ignition timing subjected to the map searching by the basic fuel correction coefficient calculation means 104, based on the acceleration/deceleration fuel correction amount or the like of the acceleration/deceleration determination means 106.

Cylinder fuel injection means 112 to 115 are fuel injection means that supplies the fuel amount calculated by basic fuel correction means 110 to the engine. Cylinder ignition means 116 to 119 are ignition means that ignites a fuel mixture flowing into a cylinder in accordance with the required ignition timing of the engine corrected by the ignition timing correction means 111. Intake valve control means 120 and exhaust valve control means 121 control the opening and closing timing of the intake and exhaust valves calculated by the intake and exhaust valve timing setting means 107.

Figure 2:
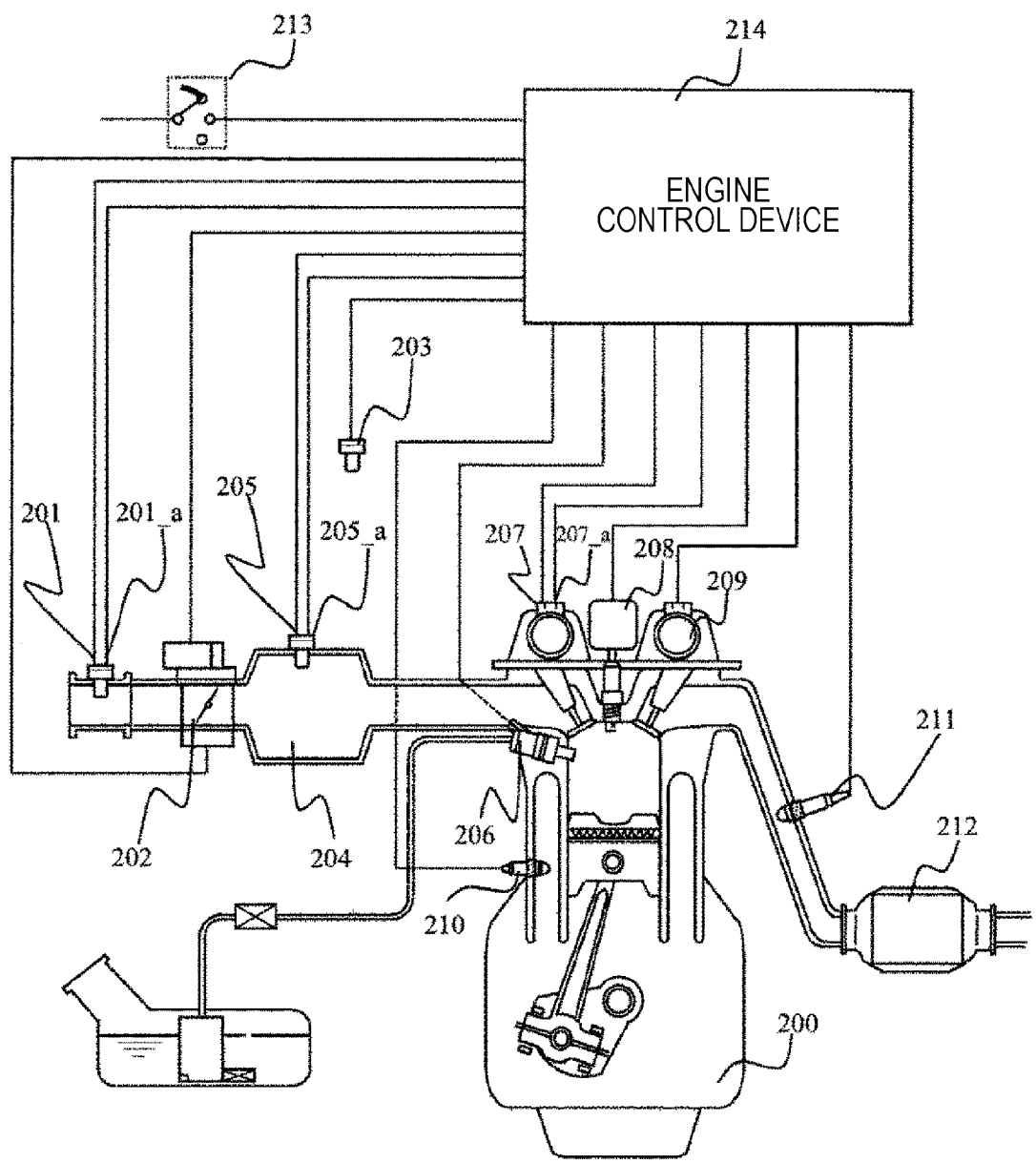
FIG. 2 is an example of a surrounding of the engine controlled by the engine control device including the method for calculating the intake pipe pressure of the engine according to the present invention.

FIG. 2 illustrates an example of a surrounding of a engine controlled by the engine control device including the method for calculating the intake pipe pressure of the engine according to the present embodiment. An H/W sensor 201 measures the air amount passing through a throttle portion of an engine, the H/W sensor 201 being integrated with a humidity sensor 201_a that measures the humidity of the air passing through the throttle portion. A throttle throttle valve 202 provided in an intake passage of the engine restricts the amount of intake air by using a motor to adjust the opening degree of the driver. An atmospheric pressure sensor 203 measures atmospheric pressure. A pressure sensor 205 measures a pressure in an intake pipe 204, the pressure sensor 205 being integrated with an intake air temperature sensor 205_a that measures the temperature of the air in the intake pipe 204. A fuel injection valve 206 supplies a fuel required by the engine. An intake valve control device 207_a controls the timing of air intake of an engine, the intake valve control device 207_a being integrated with a crank angle sensor 207 set at a predetermined crank angle position of the engine.

An exhaust valve control device 208 controls the timing of exhausting the exhaust gas of the engine. An ignition module 208 supplies ignition energy based on an ignition signal of an engine control device 214 to a spark plug that ignites a mixture of fuel supplied into the cylinder of the engine. A water temperature sensor 209 is set in a cylinder block of the engine and detects the cooling water temperature of the engine. A water temperature sensor 210 measures the temperature of the cooling water temperature of the engine. An oxygen concentration sensor 211 is set in the exhaust pipe of the engine and detects the oxygen concentration in the exhaust gas. A three-way catalyst 212 is installed behind the oxygen concentration sensor of the exhaust pipe. Further, the engine control device 214 controls an ignition key switch 213, which is a main switch that operates and stops the engine, and each auxiliary unit of the engine.

It should be noted that in the present embodiment, the humidity sensor 201_a and the H/W sensor 201 are integrated with each other, but there is no problem even if the humidity sensor 201_a and the H/W sensor 201 are separated from each other. The H/W sensor 201 may be a thermal type air flow meter. As a result, a mass flow rate of air can be measured without being affected by an intake air temperature. Similarly, the intake air temperature sensor 205_a and the pressure sensor 205 are integrated with each other, and the crank angle sensor 207 and the intake valve control device 207_a are integrated with each other, but there is no problem even if they are separated from each other. In addition, although the humidity sensor 201_a is integrated with the H/W sensor 201 to measure the humidity of the air passing through the throttle; however, the humidity sensor 201_a may separate from the H/W sensor 201 to measure the humidity of the air in an intake manifold.

Figure 5:
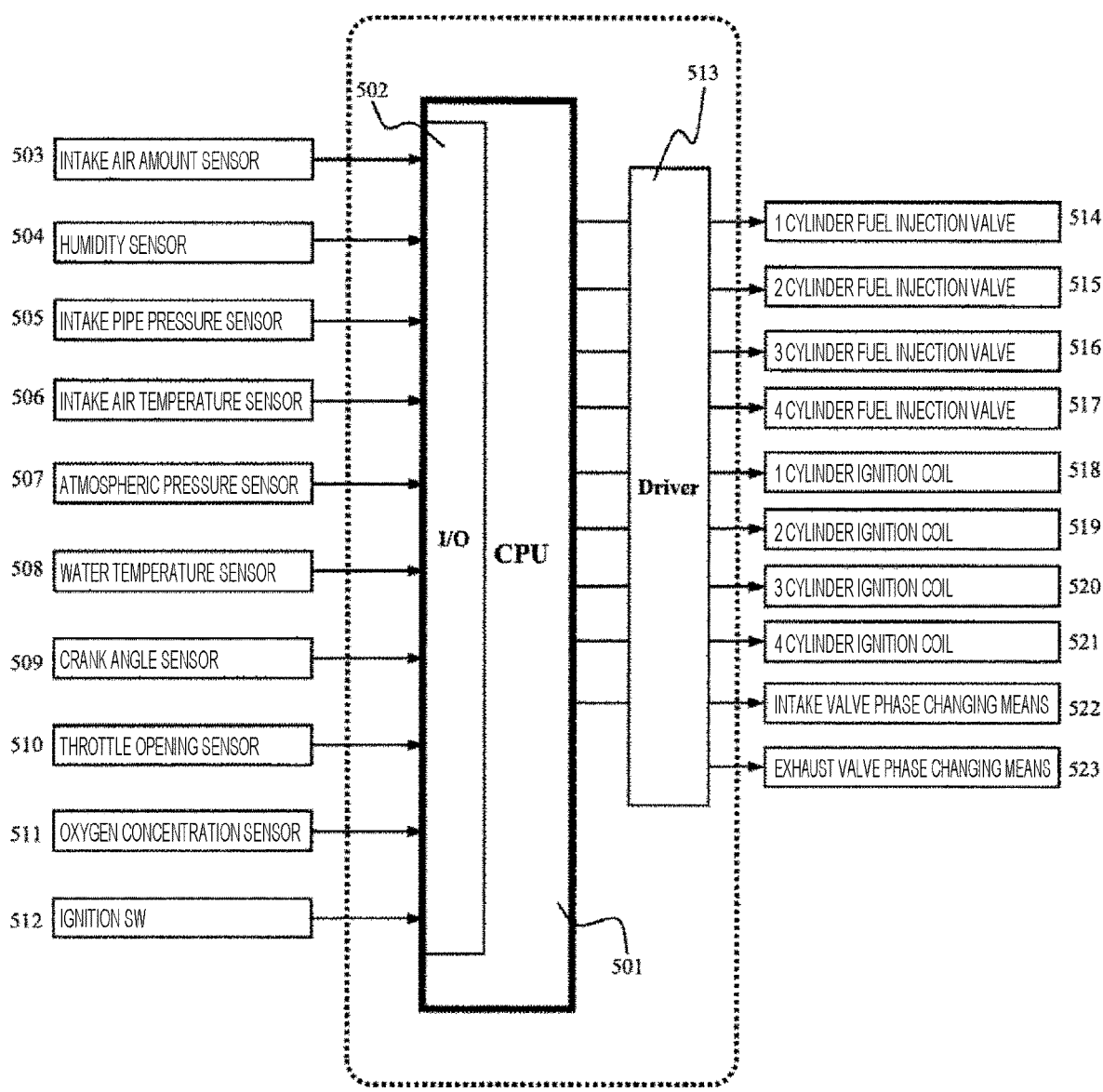
FIG. 5 is an example of an internal configuration of the engine control device including the method for calculating the intake pipe pressure of the engine according to the present invention.

FIG. 5 is an example of an internal configuration of an engine control device including a method for calculating an intake pipe pressure of an engine according to the present embodiment. In the CPU 501, an I/O unit 502 that converts an electrical signal of each sensor installed in the engine into a signal for digital calculation processing and converting a control signal for digital calculation into a driving signal of an actual actuator is set. In the I/O unit 502, an intake air amount sensor 503, a humidity sensor 504, an intake pipe pressure sensor 505, an intake air temperature sensor 506, an atmospheric pressure sensor 507, a water temperature sensor 508, a crank angle sensor 509, a throttle opening sensor 510, an oxygen concentration sensor 511, and an ignition SW 512 are input. An output signal is sent to fuel injection valves 514 to 517, ignition coils 518 to 521, intake valve phase changing means 522 and exhaust valve phase changing means 523 via an output signal driver 513 from the CPU 501.

Figure 6:
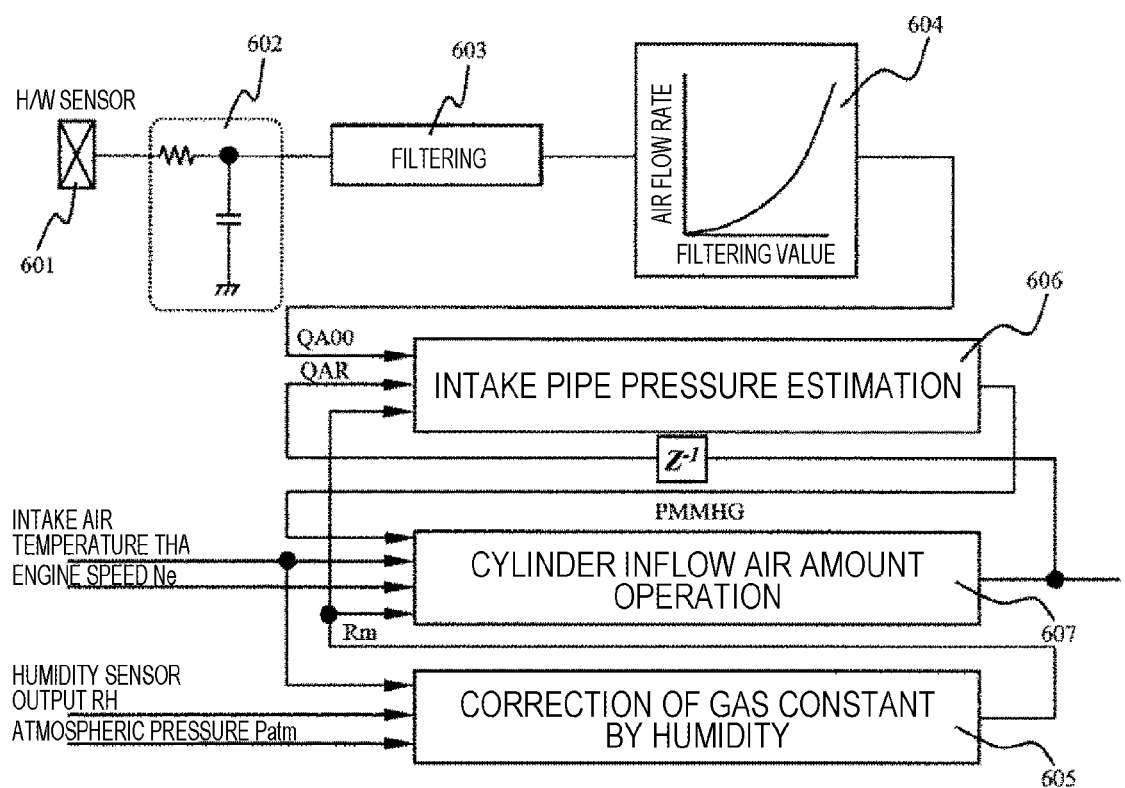
FIG. 6 is another example of FIG. 1 of a control block diagram of a basic part of the engine control device including the method for calculating the intake pipe pressure of the engine according to the present invention.

FIG. 6 is an example of FIG. 1 of a control block diagram of a basic part of the engine control device including the method for calculating the intake pipe pressure of the engine according to the present embodiment. Specifically, the CPU 501 of the engine control device illustrated in FIG. 5 performs the control of the engine illustrated in FIG. 2 by each of the functional blocks illustrated in FIG. 6. An output voltage corresponding to a flow rate of an H/W sensor 601 is subjected to filtering by a hard filter 602, and further subjected to soft filtering by a filtering 603. In a block 604, an output voltage value of an air flow subjected to the filtering is converted into an air flow rate corresponding to the voltage by table search. The CPU 501 of the engine control device has an air amount calculation unit (block 604) for calculating the air amount flowing into the cylinder of the engine based on the measurement result of the H/W sensor 601 (air amount measurement unit).

A block 605 is a block of a basic part of this embodiment, and corrects a gas constant by humidity using an intake air temperature THA, a humidity sensor output RH, and an atmospheric pressure Patm input to this block. That is, the CPU 501 of the engine control device includes a gas constant correction unit (block 605) that uses an intake air temperature THA, a humidity (humidity sensor output RH) of the atmosphere measured by a humidity measurement unit (the humidity sensor 201_a), and an atmospheric pressure Patm, to correct a gas constant according to Equation 9 described later.

A block 606 is for calculating a pressure in the intake pipe by using the gas constant corrected in block 605, and a block 607 is for calculating the air amount flowing into the cylinder based on the calculated pressure, intake air temperature, and engine speed. That is, the CPU 501 of the engine control device has a pressure calculation unit (block 606) that calculates the pressure of the intake manifold, based on the air amount measured by the H/W sensor 601 (air amount measurement unit), the air amount calculated by the air amount calculation unit (block 604), and the humidity of the atmosphere measured by the humidity measurement unit (humidity sensor 201_a).

In the block 606, a value is obtained by multiplying the air amount (H/W sensor light air amount QA00) entering the intake pipe and the air amount (cylinder inflow air amount QAR) leaving the intake pipe in (1) of Equation 1 by the theoretical coefficient including the corrected gas constant, as the change in pressure in the intake pipe. It should be noted that since a microcomputer operation is adopted, the calculation is actually performed on a continuous value by performing a Z conversion on (1) in Equation 1 as a calculation period $\Delta T$ as illustrated in (2) of Equation 1. In the block 607, the cylinder inflow air amount is obtained by calculating equation of (3) of Equation 1.

[Equation 1]

$$\frac{dPMMHG}{dt} = \frac{Rm \cdot THA}{KIMV} \cdot (QA00 - QAR) \tag{1}$$

$$PMMHG(n) = \frac{Rm \cdot THA}{KIMV} \cdot \Delta T \cdot (QA00 - QAR) + PMMHG(n-1) \tag{2}$$

$$QAR = \frac{PMMHG \cdot KSV \cdot \frac{Ne}{2}}{Rm \cdot THA} \cdot \eta \tag{3}$$

$Rm$: Gas constant
$KIMV$: Intake manifold volume
$\Delta T$: Calculation period
$\eta$: Filling efficiency As described above, in the present embodiment, since the gas constant correction unit (block 605) corrects the gas constant using the humidity sensor output RH according to Equation 9 and the pressure calculation unit (block 606) calculates the pressure of the intake manifold using the corrected gas constant, it is possible to calculate the pressure of the intake manifold more accurately.

Figure 3:
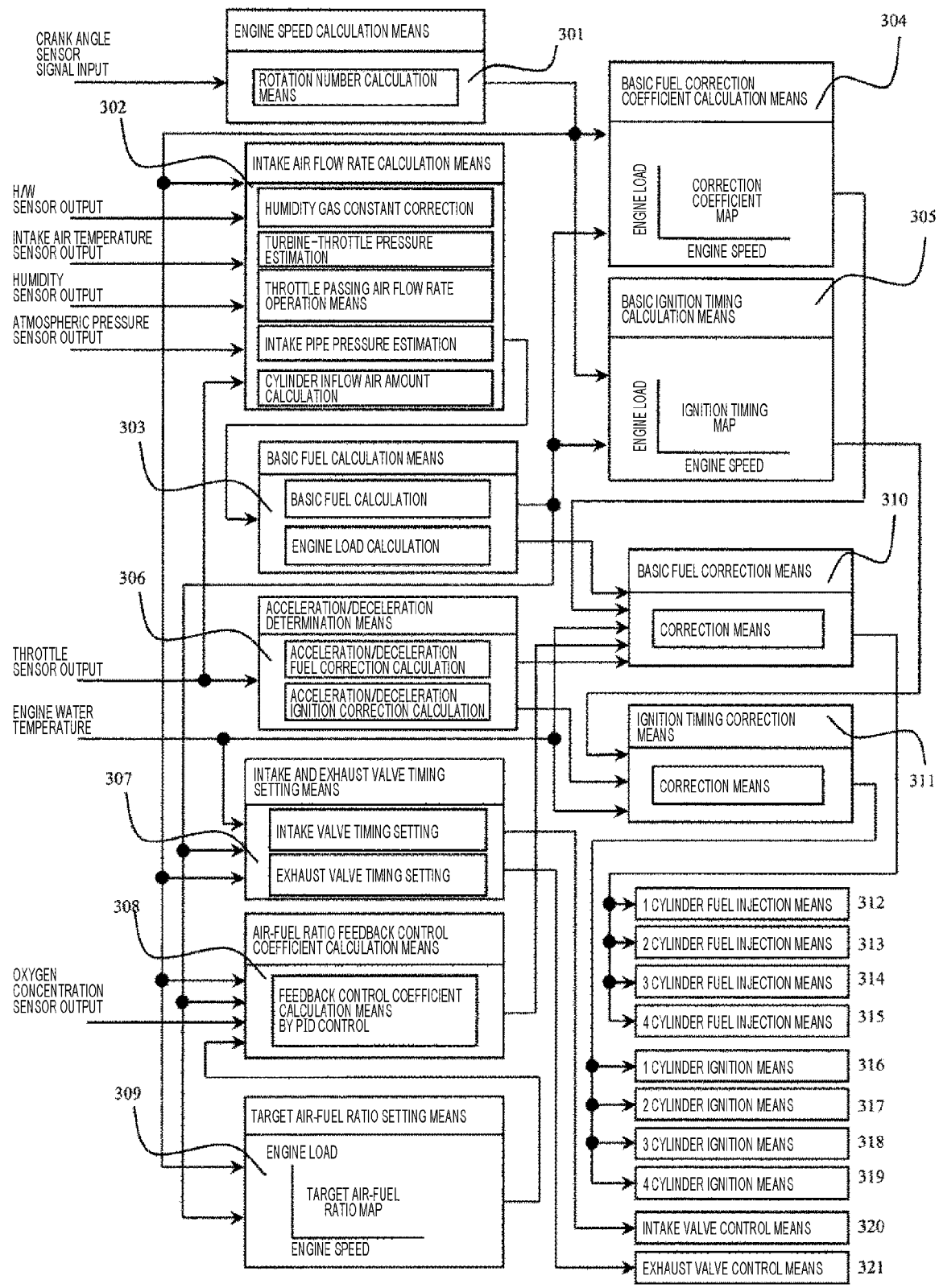
FIG. 3 is another example of a control block of the engine control device including the method for calculating the intake pipe pressure of the engine according to the present invention.

FIG. 3 is another example of a control block of the engine control device including the method for calculating the intake pipe pressure of the engine according to the present embodiment. Engine speed calculation means 301 calculates an engine speed per unit time of an engine by counting an electrical signal of a crank angle sensor set at a predetermined crank angle position of the engine, mainly the number of inputs per unit time of a pulse signal change, and performing arithmetic processing. Intake air amount calculation means 302 calculates a turbine-throttle pressure calculation value, a throttle air amount, and an intake pipe pressure calculation value, based on H/W sensor output, intake air temperature sensor output, throttle sensor output, humidity sensor output, and atmospheric pressure sensor, and calculates the air amount flowing into the cylinder of the engine using the turbine-throttle pressure calculation value, the throttle air amount, and the intake pipe pressure calculation value. Basic fuel calculation means 303 calculates basic fuel and engine load indices required by the engine in each region based on the engine speed calculated by the engine speed calculation means 301 and the air amount flowing into the cylinder of the engine. Basic fuel correction coefficient calculation means 304 calculates correction coefficients in the respective operation regions of the engine of the basic fuel calculated by the basic fuel calculation means 303 based on the engine speed and the engine load calculated by the engine speed calculation means 301. Basic ignition timing calculation means 305 determines optimal ignition timing in each region of the engine by map searching or the like based on the engine speed and the engine load.

Acceleration/deceleration determination means 306 makes a transition determination of the engine from the throttle opening degree, and calculates acceleration/deceleration fuel correction and acceleration/deceleration display correction amount accompanying the transition. Intake and exhaust valve timing setting means 307 determines opening and closing timing of the intake and exhaust valves optimum for the engine, based on the engine speed and the engine load. Air-fuel ratio feedback control coefficient calculation means 308 calculates an air-fuel ratio feedback control coefficient so that a mixture of fuel and air supplied to the engine is maintained at a target air-fuel ratio described later, from the output of an oxygen concentration sensor set in an exhaust pipe of the engine. It should be noted that although the oxygen concentration sensor described above outputs a signal proportional to an exhaust air-fuel ratio in the present embodiment, an exhaust gas may output two signals on a rich side and/or a lean side with respect to a stoichiometric air-fuel ratio.

Target air-fuel ratio setting means 309 determines optimal target air-fuel ratio in each region of the engine by map searching or the like based on the engine speed and the engine load. The target air-fuel ratio determined in this block is used for air-fuel ratio feedback control of the air-fuel ratio feedback control coefficient calculation means 308. Basic fuel correction means 310 performs correction based on a basic fuel correction coefficient of the basic fuel correction coefficient calculation means 304, an acceleration/deceleration fuel correction amount of the acceleration/deceleration determination means 306, and the air-fuel ratio feedback control coefficient of the air-fuel ratio feedback control coefficient calculation means 308, on the basic fuel calculated by the basic fuel calculation means 303. Ignition timing correction means 311 performs correction on the ignition timing subjected to the map searching by the basic fuel correction coefficient calculation means 304, based on the acceleration/deceleration fuel correction amount or the like of the acceleration/deceleration determination means 306.

Cylinder fuel injection means 312 to 315 supply the fuel amount calculated by the basic fuel correction means 310 to the engine. Cylinder ignition means 316 to 319 ignite a fuel mixture flowing into a cylinder in accordance with the required ignition timing of the engine corrected by the ignition timing correction means 311. Intake valve control means 320 and intake valve control means 321 control the opening and closing timing of the intake and exhaust valves calculated by the intake and exhaust valve timing setting means 307.

Figure 4:
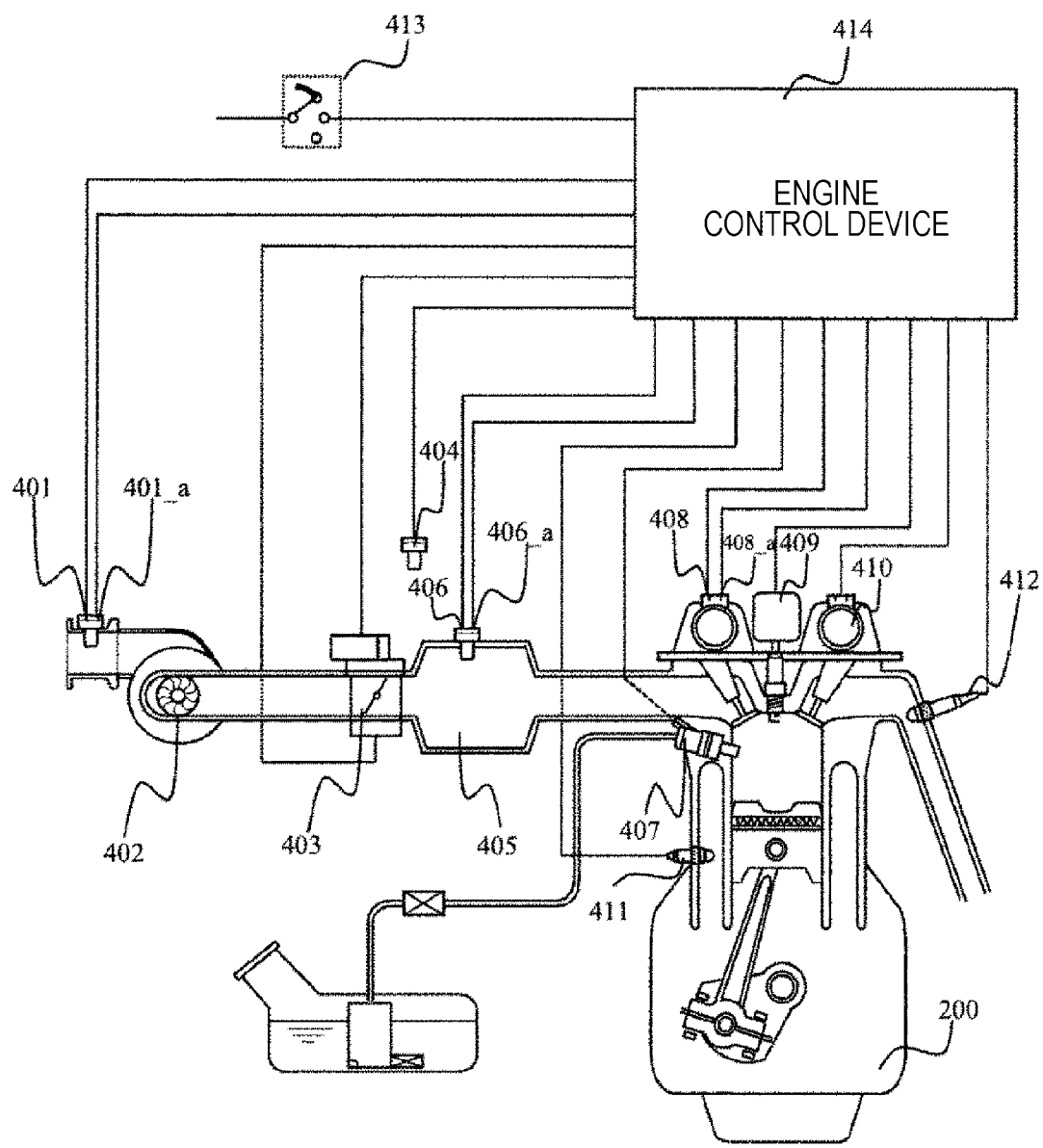
FIG. 4 is another example of a surrounding of the engine controlled by the engine control device including the method for calculating the intake pipe pressure of the engine according to the present invention.

FIG. 4 illustrates another example of a surrounding of the engine controlled by the engine control device including the method for calculating the intake pipe pressure of the engine according to the present embodiment. In an engine 400, an H/W sensor 401 that measures the air amount passing through a throttle portion of an engine is attached, the H/W sensor 401 being integrated with a humidity sensor 401_a that measures the humidity of the air passing through the throttle portion. The engine 400 is provided with a supercharger 402 that is set on a downstream side of an H/W sensor 401 and pressurizes the air amount sucked in conjunction with a turbine on an exhaust side, a throttle throttle valve 403 that limits the air amount sucked, by using the motor to adjust an opening degree of a driver, an atmospheric pressure sensor 404 that measures an atmospheric pressure, and a pressure sensor 406 that measures the pressure in an intake pipe 405, the pressure sensor 406 being integrated with an intake air temperature sensor 406_a that measures the temperature of the air in the intake pipe 405. That is, the H/W sensor 401 measures the humidity of air flowing into the supercharger 402 with the humidity sensor 401_a and measures the air amount.

Further, the engine 400 is provided with a fuel injection valve 407 that supplies fuel required by the engine, an intake valve control device 408_a that controls timing of air intake of the engine, the intake valve control device 408 being integrated with a crank angle sensor 408 set at a predetermined crank angle position of the engine, and an ignition module 409 that supplies ignition energy based on an ignition signal of an engine control device 414 to a spark plug which ignites a mixture of fuel supplied into the cylinder of the engine. Furthermore, the engine 400 is provided with an exhaust valve control device 410 that controls timing of exhausting the exhaust gas of the engine, a water temperature sensor 411 that is set as a cylinder block of the engine and detects the cooling water temperature of the engine, an oxygen concentration sensor 412 that is set in the exhaust pipe of the engine and detects the oxygen concentration in the exhaust gas, an ignition key switch 413 that is a main switch that drives and stops the engine, and an engine control device 414 that controls each auxiliary device of the engine. It should be noted that in the present embodiment, as in FIG. 2, the humidity sensor 401_a and the H/W sensor 401 are integrated with each other, but there is no problem even if the humidity sensor 201_a and the H/W sensor 201 are separated from each other. Similarly, the intake air temperature sensor 406_a and the pressure sensor 406 are integrated with each other, and the crank angle sensor 208 and the intake valve control device 408_a are integrated with each other, but there is no problem even if they are separated from each other.

In addition, although the humidity sensor 401_a integrates with the H/W sensor 401 to measure the humidity of the air passing through the throttle; however, the humidity sensor 401_a separates from the H/W sensor 401 and measures the humidity between a turbine and a throttle, or the humidity of the air in an intake manifold.

Figure 7:
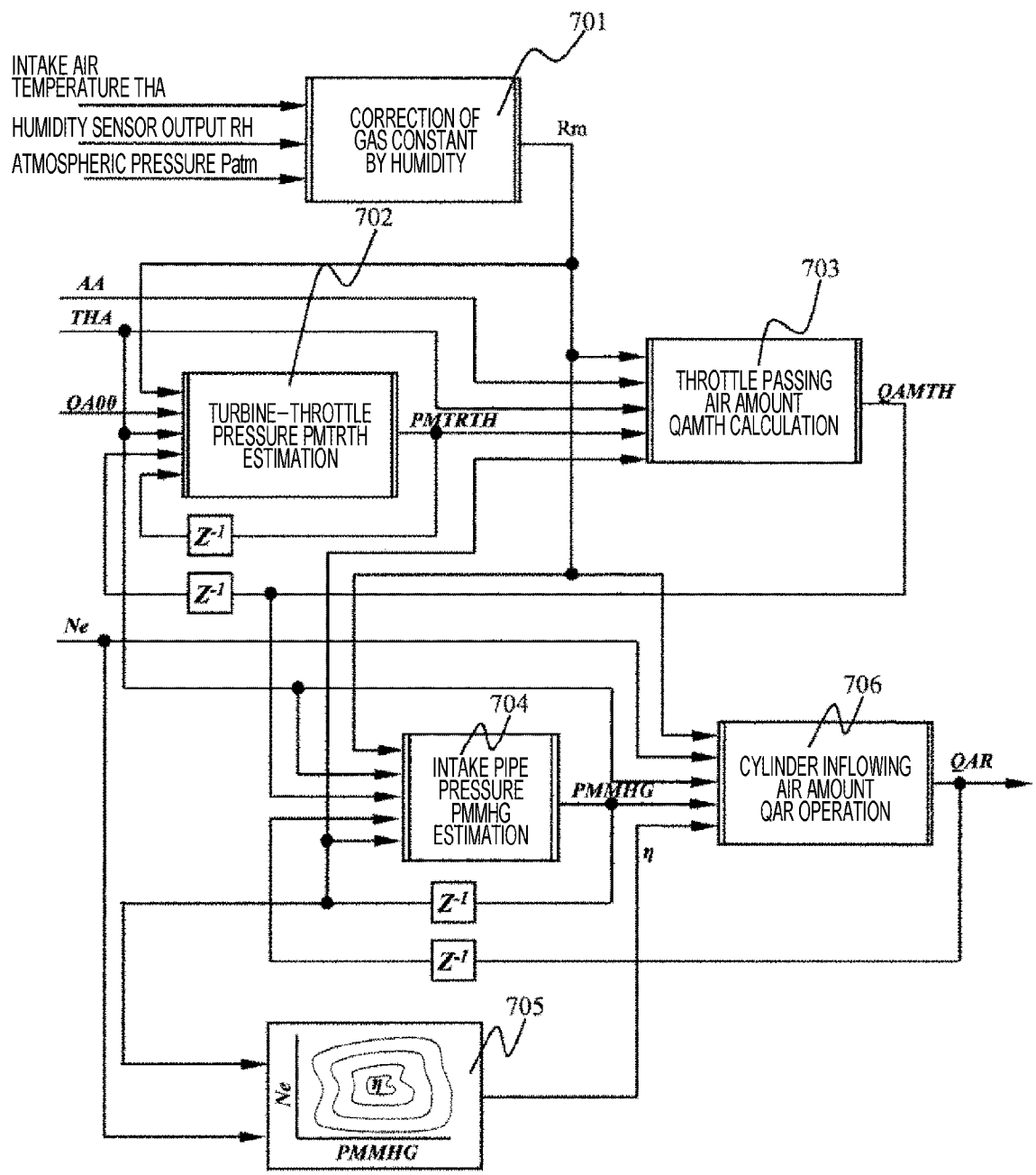
FIG. 7 is an example of FIG. 3 of a control block diagram of a basic part of the engine control device including the method for calculating the intake pipe pressure of the engine according to the present invention.

FIG. 7 is an example of FIG. 3 of a control block diagram of a basic part of the engine control device including the method for calculating the intake pipe pressure of the engine according to the present embodiment. Specifically, the CPU 501 of the engine control device illustrated in FIG. 5 performs the control of the engine illustrated in FIG. 4 by each of the functional blocks illustrated in FIG. 7. A block 701 is a block for correcting a gas constant by humidity using the intake air temperature THA, the humidity sensor output RH, and the atmospheric pressure Patm. That is, the CPU 501 of the engine control device includes a gas constant correction unit (block 701) that uses an intake air temperature THA, a humidity (humidity sensor output RH) of the atmosphere measured by a humidity measurement unit (the humidity sensor 401_a), and an atmospheric pressure Patm, to correct a gas constant according to Equation 9 described later.

A block 702 is a block for calculating a turbine-throttle pressure PMTRTH. The current PMTRTH is calculated using the corrected gas constant Rm, the intake air amount QA00, the intake air temperature THA, a throttle passing air amount QAMTH calculated previously, and a PMTRTH calculated previously. Therefore, a pressure calculation unit (block 702) of the CPU 501 of the engine control device has a pressure calculation unit (block 702) that calculates the turbine-throttle pressure PMTRTH, based on the air amount measured by the H/W sensor 401 (air amount measurement unit), the air amount calculated by a throttle passing air amount calculation unit (block 703) that calculates the air amount passing through the throttle throttle valve 403 on a downstream side of the supercharger 402, and the humidity of the atmosphere measured by the humidity measurement unit (humidity sensor 401_a).

A block 703 is a block for calculating a throttle passing air amount QAMTH. The QAMTH is calculated using the corrected gas constant Rm, a throttle opening area AA, an intake air temperature, the turbine-throttle pressure PMTRTH, and an intake pipe pressure PMMHG calculated previously. That is, the CPU 501 of the engine control device has the throttle passing air amount calculation unit (block 703) that calculates the throttle passing air amount QAMTH, based on the humidity of the atmosphere measured by the humidity measurement unit (humidity sensor 401_a).

A block 704 is a block for calculating an intake pipe pressure PMMHG. The current PMMHG is calculated using the corrected gas constant Rm, the intake air temperature THA, the throttle passing air amount QAMTH, the cylinder inflow air amount QAR calculated previously, and the PMMHG calculated previously. That is, the CPU 501 of the engine control device has an intake pipe pressure calculation unit (block 704) that calculates the intake pipe pressure PMMHG of an intake manifold 405 on a downstream side of the throttle throttle valve 403, based on the throttle passing air amount QAMTH passing through the throttle throttle valve 403 calculated by the throttle passing air amount calculation unit (block 703), the turbine-throttle pressure PMTRTH between the supercharger 402 and the throttle throttle valve 403 on the downstream side of the supercharger 402, the turbine-throttle pressure PMTRTH being calculated by the pressure calculation unit (block 702), and the humidity measured by the humidity measurement unit (humidity sensor 401_a).

A block 705 is obtained by performing a map searching on an intake efficiency η which is a nonlinear element from an engine speed Ne and the intake pipe pressure PMMHG. η is for correcting a deviation from the theoretical value of the cylinder inflow air amount found based on the intake pipe pressure. A block 706 is a block for determining the cylinder inflow air amount QAR. The QAR is calculated based on the corrected gas constant Rm, the engine speed Ne, the intake air temperature THA, the intake pipe pressure PMMHG, and the intake efficiency η described above. That is, the CPU 501 of the engine control device has a cylinder inflow air amount calculation unit (block 705) that calculates a cylinder inflow air amount QAR, based on the air amount passing through the throttle throttle valve 403, the air amount being calculated by the throttle passing air amount calculation unit (block 703), and a pressure between the supercharger and a throttle throttle valve on the downstream side of the supercharger, the pressure being calculated by the pressure calculation unit and, the humidity of the atmosphere measured by the humidity measurement unit (humidity sensor 401_a). In the present embodiment, the turbine-throttle pressure is calculated from the intake air amount or the like. However, when means for obtaining a pressure of the turbine-throttle is provided, the output value therefor may be used.

Equation 2 represents a theoretical equation for obtaining the turbine-throttle pressure in FIG. 7 described above. (1) of Equation 1 represents a theoretical equation in a continuous region, and represents that the inflow/outflow of air in a minute time between the turbine and the throttle becomes a pressure gradient between the turbine and the throttle. (2) of Equation 1 is obtained by discretizing the equation (1) of Equation 1, and the pressure calculation unit (block 702) obtains the turbine-throttle pressure PMTRTH by executing this equation.

[Equation 2]

$$\frac{dPMTRTH}{dt} = \frac{Rm \cdot THA}{KTRTHV} \cdot (QA00 - QAMTH) \quad (1)$$

$$PMTRTH(n) = \frac{Rm \cdot THA}{KTRTHV} \cdot \Delta T \cdot (QA00 - QAMTH) + PMTRTH(n-1) \quad (2)$$

Rm: Air gas constant
KTRTHV: Turbine-throttle volume
ΔT: Calculation period
THA: Intake air temperature Equation 3 represents a theoretical equation for obtaining the throttle passing air amount QAMTH in FIG. 5, and the throttle passing air amount calculation unit (block 703) calculates the throttle passing air amount QAMTH using this equation.

[Equation 3]

$$QAMTH = AA \cdot \frac{PMTRTH}{\sqrt{Rm \times (THA + 273)}} \sqrt{\frac{2k}{k-1}\left\{\left(\frac{PMMHG}{PMTRTH}\right)^{\frac{2}{k}} - \left(\frac{PMMHG}{PMTRTH}\right)^{\frac{k+1}{k}}\right\}}$$

Rm: Air gas constant
AA: Throttle opening area
THA: Intake air temperature
k: Specific heat ratio Equation 4 represents a theoretical equation for obtaining the intake pipe pressure PMMHG in FIG. 5 described above. Similarly to the above-described Equation 2, (1) of Equation 4 represents a theoretical equation in a continuous range, and represents that the inflow/outflow of air into the intake pipe in a minute time becomes a pressure gradient in the intake pipe. (2) of Equation 4 is obtained by discretizing (1) of Equation 4, and the intake pipe pressure calculation unit (block 704) calculates the intake pipe pressure PMMHG by executing this equation.

[Equation 4]

$$\frac{dPMMHG}{dt} = \frac{Rm \cdot THA}{KIMV} \cdot (QAMTH - QAR) \quad (1)$$

$$PMMHG(n) = \frac{Rm \cdot THA}{KIMV} \cdot \Delta T \cdot (QAMTH - QAR) + PMMHG(n-1) \quad (2)$$

Rm: Air gas constant
KIMV: Intake pipe volume (throttle-intake valve volume)
ΔT: Calculation period
THA: Intake air temperature Equation 5 represents a theoretical equation for obtaining the cylinder inflow air amount QAR of FIG. 7, and the cylinder inflow air amount calculation unit (block 705) calculates the cylinder inflow air amount QAR using this.

[Equation 5]

$$QAR = \frac{PMMHG \cdot KSV \cdot \frac{Ne}{2}}{Rm \cdot THA} \cdot \eta$$

Figure 8:
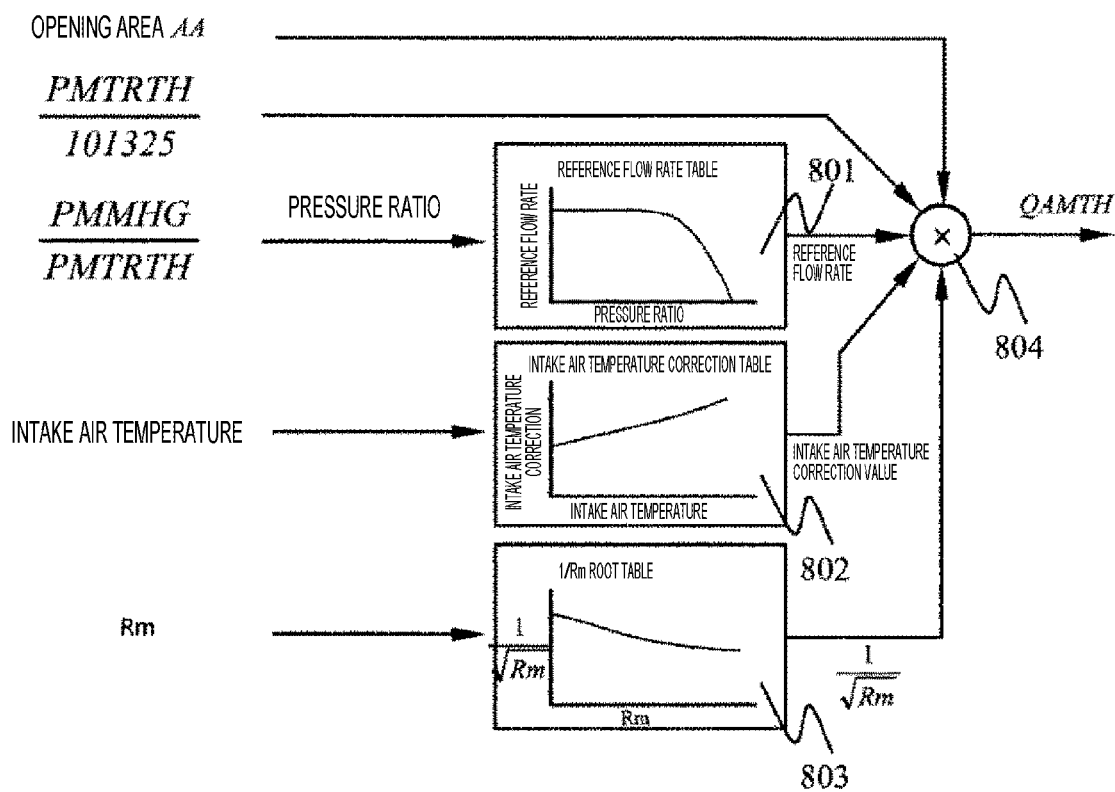
FIG. 8 is an example of how to specifically determine a throttle passing air flow rate in FIG. 7.

KSV: Engine displacement
Ne: Engine speed
KAIRGAS: Air gas constant
THA: Intake air temperature
$\eta$: Intake efficiency FIG. 8 is an example of how to specifically determine a throttle passing air flow rate in FIG. 7 described above. In a block 801, a table of inflow air amount at the time of reference opening area based on the ratio of the intake pipe pressure PMMHG and the turbine-throttle pressure at the constant intake air temperature is set, and a reference flow rate is output. Specifically, a calculation value of Equation 6 (1) is set. In a block 802, an intake air temperature correction value of the above-described reference flow rate is tabulated, specifically, a calculation value of Equation 6 (2) is set. The throttle passing air flow rate QAMTH is calculated by a multiplier 804, based on throttle opening area AA×turbine-throttle pressure PMTRTH/101325×reference flow×intake air temperature correction value×1/√gas constant Rm.

[Equation 6]

Reference flow rate table: (1)

$$\frac{101325}{\sqrt{(27+273)}} \sqrt{\frac{2k}{k-1}\left\{\left(\frac{PMMHG}{PMTRTH}\right)^{\frac{2}{k}} - \left(\frac{PMMHG}{PMTRTH}\right)^{\frac{k+1}{k}}\right\}}$$

Intake air temperature correction table: (2)

$$\frac{\sqrt{(27+273)}}{\sqrt{(\text{Intake air temperature}+273)}}$$

Equation 7 represents a state equation of an ideal gas in the intake pipe. Ru represents a universal gas constant, and n is the number of moles of air.

$P \cdot V = n \cdot Ru \cdot T$  [Equation 7]

Ru: universal gas constant=8.3145 [J/mol/K]
P: pressure [Pa], V: volume [m³], n: number of moles of air Equation 8 represents that the number of moles of gas is divided by the molar mass of air.

[Equation 8]

$$n = \frac{m}{W}$$

n: Molar mass of gas
M: Mass of air[kg]
W: Molar mass of air[kg/mol]

Equation 9 (1) is obtained by substituting Equation 8 into Equation 7, which can be transformed as Equation 9 (2). The gas constant used in this embodiment is expressed by Equation 9 (3) and is a value obtained by dividing the universal gas constant Ru by the total number of moles W of air, and the total number of moles W of air can be obtained from an absolute humidity xvap, a molar mass W air of dry air and a molar mass WH2O of water (steam) as expressed by Equation 9 (4). As represented in Equation 9 (4), the gas constant is affected by absolute humidity. The absolute humidity xvap is represented by an equation 9 (5), and is a value obtained by dividing a water vapor pressure Pvap of water by the atmospheric pressure Patm, and the water vapor pressure Pvap of water can be obtained by multiplying a saturated water vapor pressure Psat by a value obtained by dividing a relative humidity RH by 100. Equation 9 (6) represents an approximation of a relationship between the saturated water vapor pressure Psat and an air temperature (intake air temperature) t. In the case of realizing with a microcomputer, this equation may be calculated, but it may be realized by a table of the temperature (intake air temperature) t and the saturated water vapor pressure Psat. According to Equation 9, as the humidity RH increases, the total number of moles W of air decreases and the gas constant Rm increases, so that an intake pipe pressure P increases. Similarly, an intake pipe calculated pressure using this equation also increases. When the atmospheric pressure Patm becomes smaller, the total number of moles W of air becomes smaller and the gas constant Rm becomes larger as described above. Therefore, the intake pipe pressure, and an intake pipe pressure calculation value P increase.

[Equation 9]

$$P \cdot V = \frac{M}{W} \cdot Ru \cdot T \quad (1)$$

$$P \cdot V = M \cdot \frac{Ru}{W} \cdot T \quad (2)$$

$$Rm = \frac{Ru}{W} [\text{J/kg/K}] \quad (3)$$

$$W = (1 - x_{vap}) \cdot W_{air} + x_{vap} \cdot W_{H2O} \quad (4)$$

$W_{air}$: Molar mass of dry air = 0.0288[kg/mol]
$W_{H2O}$: Molar mass of water = 0.018[kg/mol]

$$x_{vap}: \text{Absolute humidity}= x_{vap} = \frac{P_{vap}}{P_{atm}} = \frac{P_{sat} \cdot \frac{RH}{100}}{P_{atm}} \quad (5)$$

$p_{avp}$: Water vapor partial pressure[Pa],
$P_{atm}$: Atmospheric pressure[Pa],
$P_{sat}$: Saturated water vapor pressure[Pa], $$P_{sat} = \frac{101325}{1013} \times 6.11 \times 10^{\frac{75t}{t+2373}} \quad (6)$$

t: Temperature (intake air temperature)[° C.]

Figure 9:
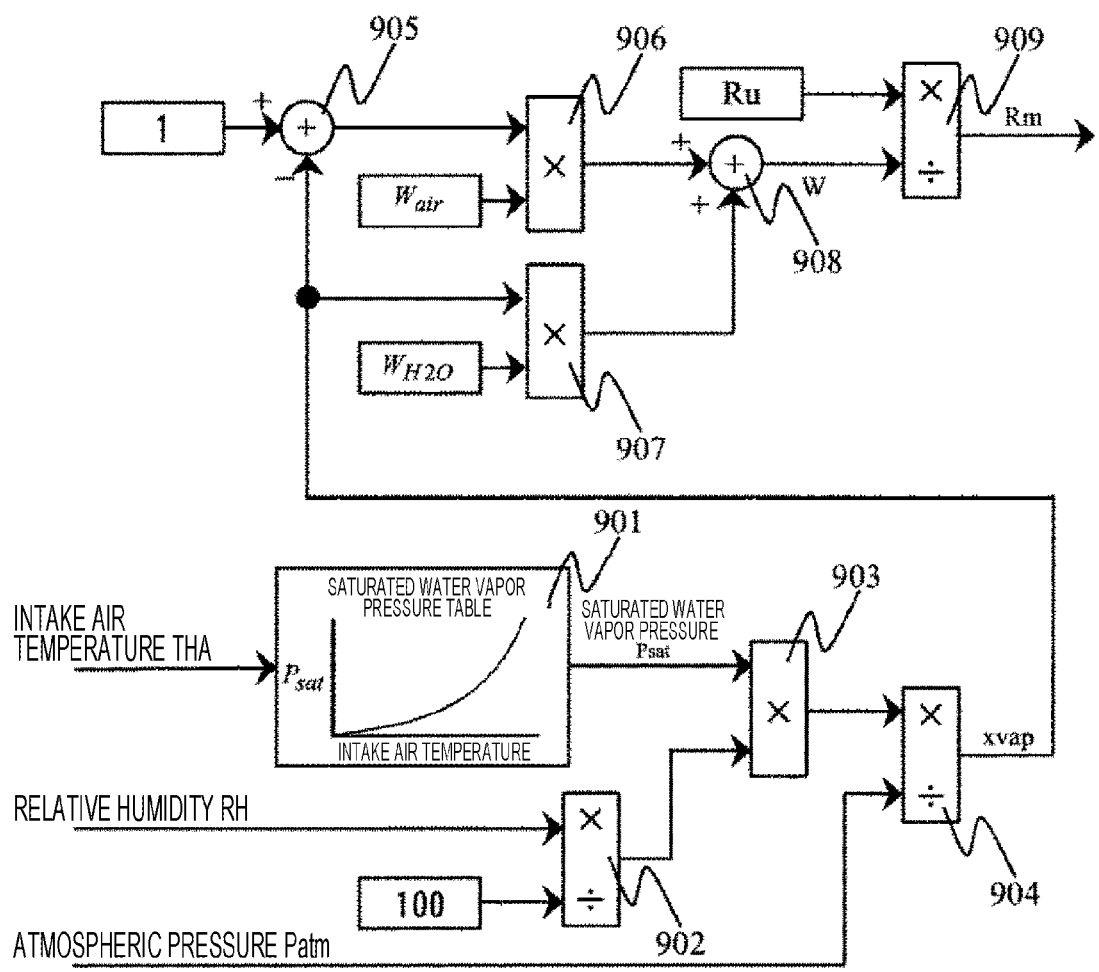
FIG. 9 illustrates a block diagram in which a theoretical equation of Equation 9 is calculated with a microcomputer.

FIG. 9 illustrates a block diagram in which a theoretical equation of Equation 9 is calculated with a microcomputer. In a block 901, the saturated water vapor pressure Psat is subjected to a table searching with the intake air temperature THA. In a block 902, the relative humidity RH is divided by 100, and in a block 903, the resultant value is multiplied by the saturated water vapor pressure Psat. The multiplied value is divided by the atmospheric pressure at a block 904 and the absolute humidity xvap is output. At a block 905, the absolute humidity xvap is subtracted from 1, the resultant value is multiplied by the molar mass of dry air at a block 906, the resultant value is multiplied by the absolute humidity xvap and the molar mass of water at a block 907, the value multiplied at a block 908 is added to the resultant values, and the total number of moles W of air is output. In a block 909, the universal gas constant is divided by the total number of moles W of the above-mentioned air to output the humidity-corrected gas constant Rm.

Figure 10:
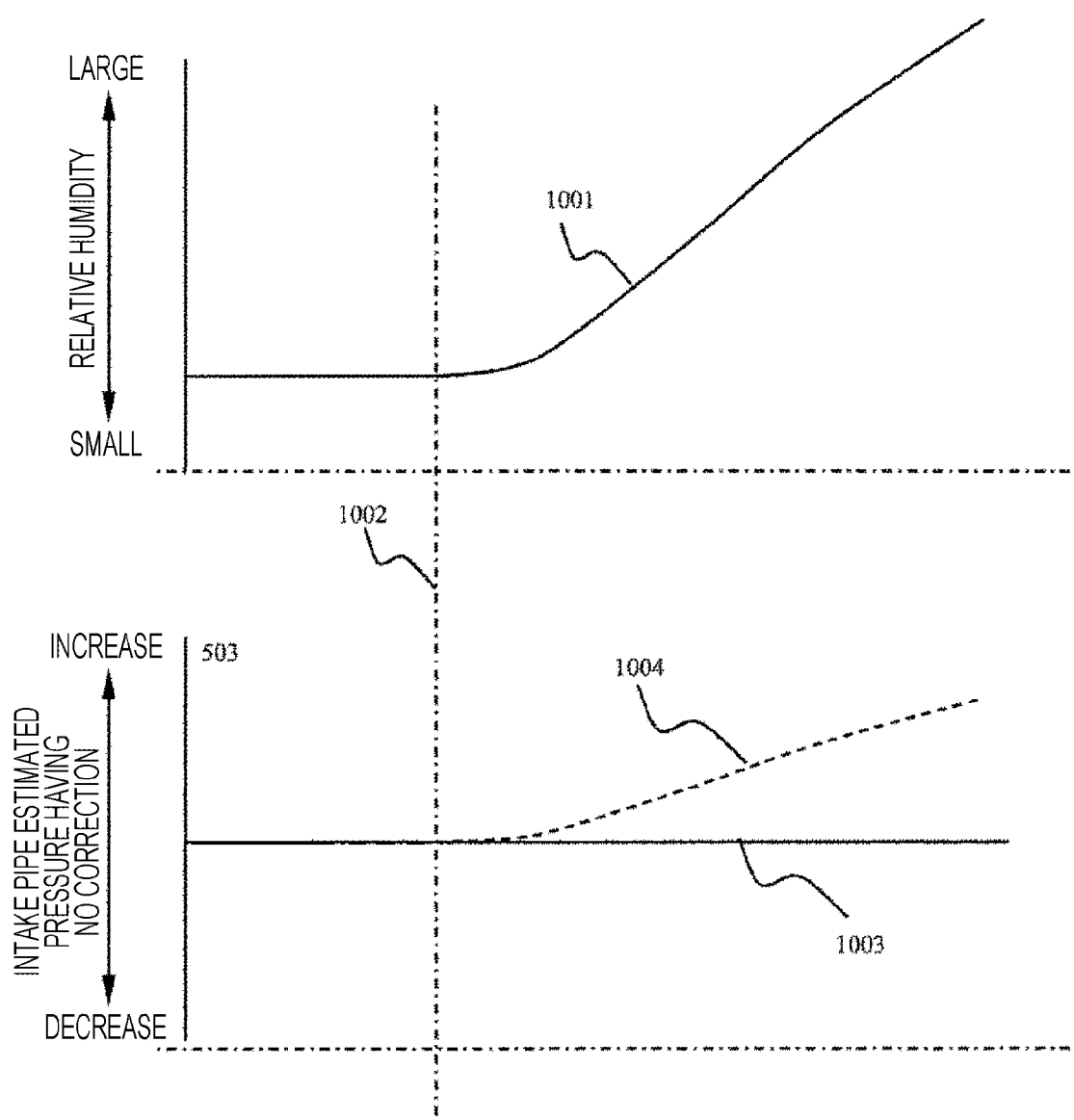
FIG. 10 is an output example of a calculated pressure of the engine control device including the method for calculating the intake pipe pressure of the engine according to the present invention.

FIG. 10 is an output example of a calculated pressure of the engine control device including the method for calculating the intake pipe pressure of the engine according to the present embodiment. A line 1001 represents a relative humidity, and is changed from a timing 1002. On the other hand, the intake pipe calculated pressure remains constant as shown by a line 1003 when there is no main humidity correction, but the intake pipe calculation pressure changes as shown by a line 1004 when there is a correction. The pressure calculation unit (block 606, block 702) calculates the pressure of the intake manifold (204, 405) so that the humidity measured by the humidity measurement unit (humidity sensor 201_a, humidity sensor 401_a) increases.

Figure 11:
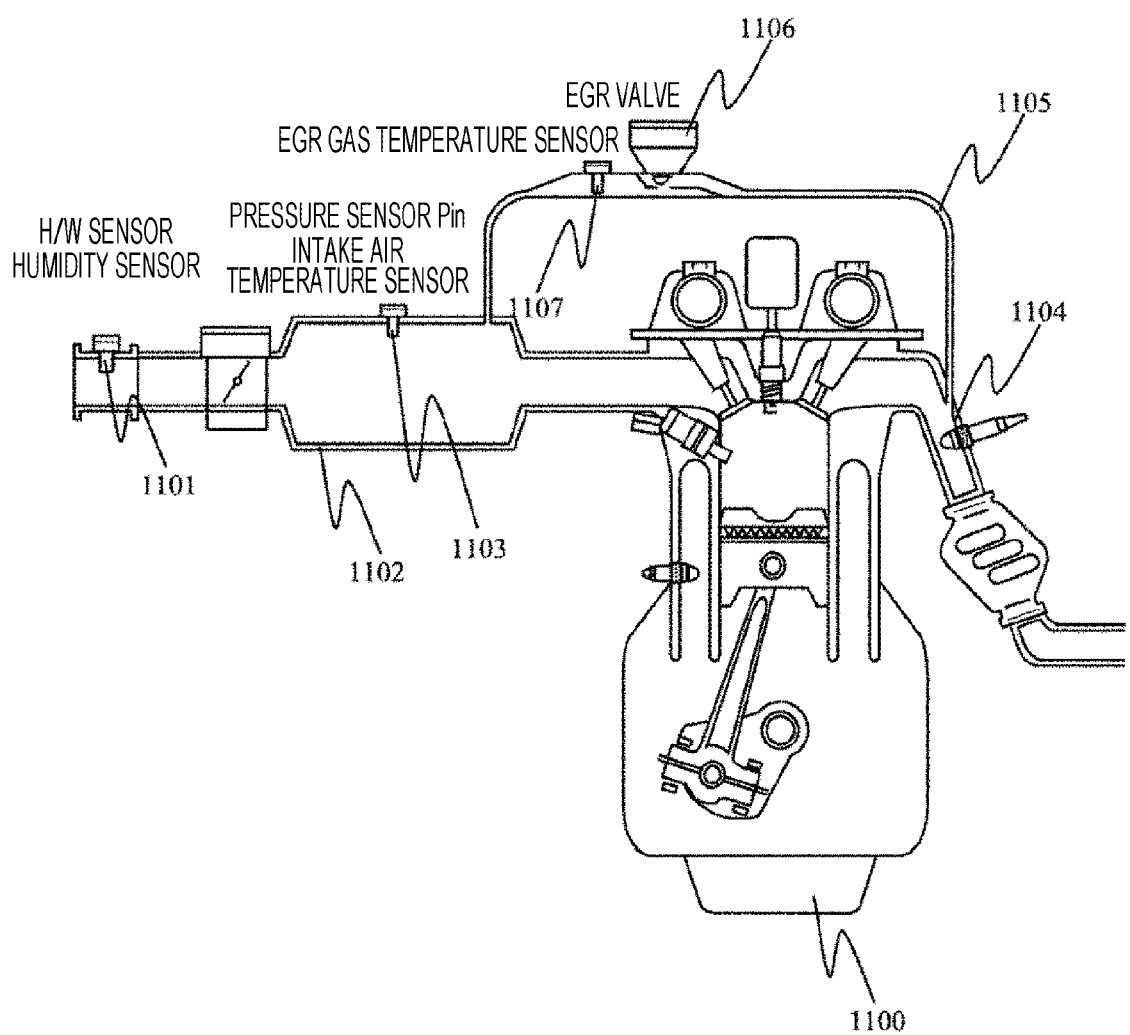
FIG. 11 is an example where the engine control device including the method for calculating the intake pipe pressure of the engine according to the present invention includes an exhaust gas recirculation device.

FIG. 11 is an example where the engine control device including the method for calculating the intake pipe pressure of the engine according to the present embodiment includes an exhaust gas recirculation device. An engine 1100 includes an H/W sensor 1101 that measures the air amount passing through the throttle portion of the engine, the H/W sensor 1101 being integrated with a humidity sensor that measures the humidity of the air passing through the throttle portion, a pressure sensor 1103 that measures a pressure inside an intake pipe 1102, the pressure sensor 1103 being integrated with an intake air temperature sensor that measures the temperature of the air inside an intake passage, a passage 1105 that connects an exhaust pipe 1104 of the engine and the intake pipe 1102, an EGR valve 1106 that is set in the middle of the passage 1105 connecting the exhaust pipe 1104 and the intake pipe 1102 and adjusts the flow rate of the exhaust gas flowing in the passage 1105, and an EGR gas temperature sensor 1107 that measures the exhaust gas temperature in the passage 1105.

Equation 10 represents the relationship of the pressure in the intake pipe. Intake pipe actual measurement pressure is a partial pressure of air in the intake pipe, that is, a value obtained by adding the intake pipe calculated pressure and an EGR partial pressure in the intake pipe.

$$Pin = Pm + Pegr \quad [\text{Equation 10}]$$

Pin: Intake pipe actual measurement pressure
Pm: Intake pipe air partial pressure (intake pipe estimated pressure)
Peg: Intake pipe EGR partial pressure Equation 11 (1) is the relationship of Equation 10 and can be transformed as Equation 11 (2). The EGR partial pressure in the intake pipe is a value obtained by subtracting air partial pressure (intake pipe calculated pressure) from the intake pipe actual measurement pressure. Equation 11 (3) is a modification of the state equation of the EGR gas in the intake pipe, and represents an intake pipe EGR gas density. Equation 11 (4) is a modification of the state equation of the air in the intake pipe and represents an air density in the intake pipe. In this case, Pm is the intake pipe calculated pressure. Equation 11 (5) is an equation of the EGR rate, and represents that an EGR rate can be obtained by a value obtained by adding the intake pipe EGR gas density and the air density in the intake pipe.

The pressure calculation unit (block 606) calculates the pressure of the intake manifold (intake pipe 1102) from the humidity measured by the humidity measurement unit (humidity sensor 1101) by the above-described method. Then, the CPU 501 of the engine control device has an EGR valve control unit that controls the opening degree of the EGR valve 1106 so that a difference between the detection value of the pressure sensor 1103 and the pressure calculated by the pressure calculation unit (block 606) becomes a set value. When the humidity measured by the humidity measurement unit (humidity sensor 1101) changes, the EGR valve control unit controls the opening degree of the EGR valve 1106 (throttle valve) so as to change an exhaust gas recirculation amount of the passage connecting the exhaust pipe and the intake pipe.

Here, when the humidity increases as described in claim 11, the intake pipe estimated pressure increases. Then, when Pm becomes larger than the last equation of Equation 11, the EGR rate decreases; therefore, when the humidity increases, the EGR valve control unit controls the opening degree of the EGR valve 1106 (throttle valve) so as to be increased in order to achieve a target EGR rate.

Incidentally, as an EGR gas amount increases, an NOx emission amount decreases, but an engine surge increases. Therefore, the above set value is set so that the engine surge is not more than the predetermined value while the NOx emission amount is not more than the predetermined value. That is, the set value is set to a value at which both emissions such as NOx and drivability are compatible in an operation region.

[Equation 11]

$$Pin = Pm + Pegr$$
$$Pegr = Pin - Pm$$

Pegr: EGR partial pressure[Pa],

Pin: Intake pipe actual measurement pressure[Pa],
Pm: Air partial pressure (intake pipe estimated pressure)[Pa]

$$Pegr \cdot Vin = Megr \cdot Regr \cdot Tegr$$

Vin: Intake pipe volume[m$^3$],
Megr: EGR mass[Kg],
Regr: Exhaust gas gas constant[J/kg/K]
Tegr: Exhaust gas temperature[K]

$$\sigma egr = \frac{Pegr}{Regr \cdot Tegr} = \frac{Megr}{Vin}$$

$\sigma egr$ = Intake pipe EGR density[Kg/m$^3$]

$$\sigma air = \frac{Pm}{Rair \cdot Tair} = \frac{Mair}{Vin}$$

$\sigma air$: Intake pipe air density[Kg/m$^3$]

$$EGR \text{ rate} = \frac{\sigma egr}{\sigma air + \sigma egr} = \frac{\frac{Pegr}{Regr \cdot Tegr}}{\frac{Pm}{Rair \cdot Tair} + \frac{Pegr}{Regr \cdot Tegr}}$$

Figure 12:
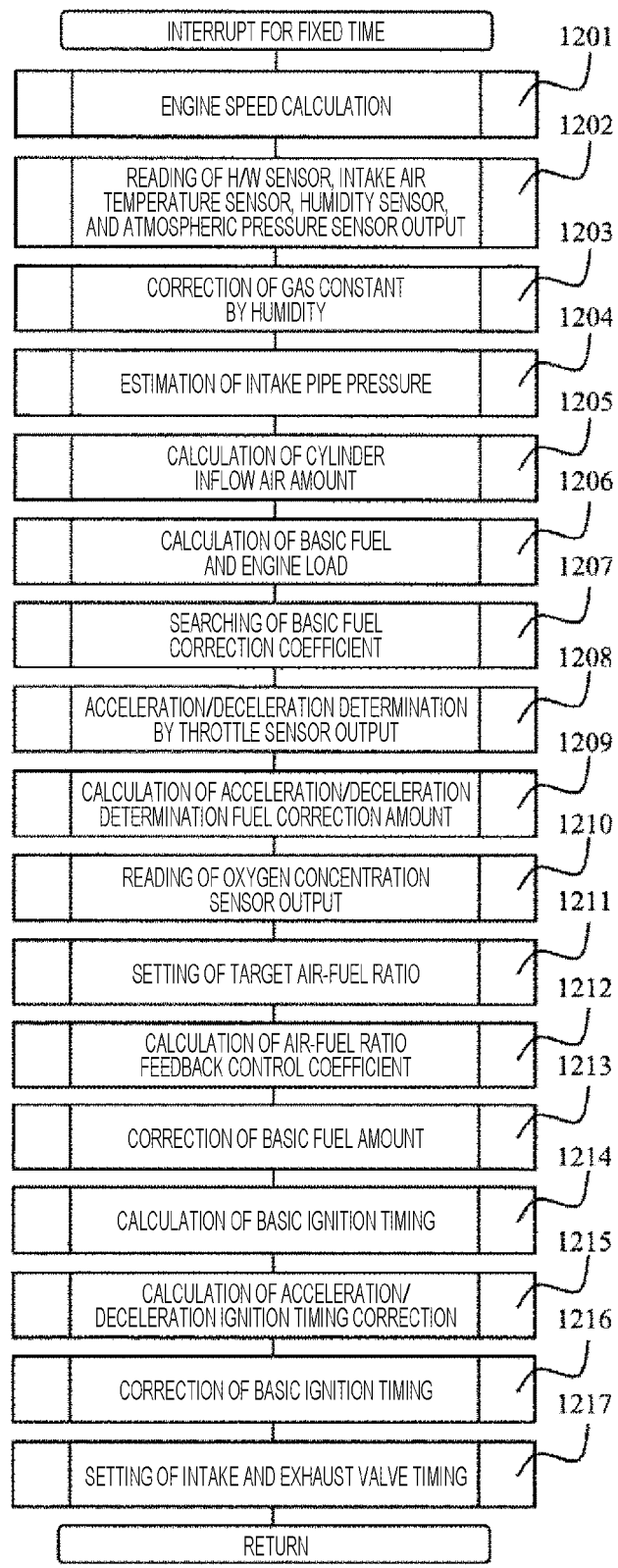
FIG. 12 is an example of a detailed flowchart of FIG. 1 of the control block of the engine control device including the method for calculating the intake pipe pressure of the engine according to the present invention.

FIG. 12 is an example of a detailed flowchart of FIG. 1 of the control block of the engine control device including the method for calculating the intake pipe pressure of the engine according to the present embodiment. In a block 1201, an engine speed is calculated. In a block 1202, the outputs of the H/W sensor, the intake air temperature sensor, the humidity sensor, and the atmospheric pressure sensor are read. In a block 1203, a gas constant is corrected by humidity. In a block 1204, an intake pipe pressure is calculated. In a block 1205, a cylinder inflow air amount flowing into the cylinder of the engine from the calculation value of the intake pipe pressure is calculated. In a block 1206, a basic engine fuel and an engine load are calculated from the engine speed and the cylinder inflow air amount. In a block 1207, a basic fuel correction coefficient of the engine is subjected to a map searching, based on the engine speed and the engine load. In a block 1208, acceleration/deceleration determination is performed by the throttle sensor output. In a block 1209, a fuel correction amount at the time of acceleration/deceleration determination is calculated. In a block 1210, an oxygen concentration sensor output is read. In a block 1211, a target air-fuel ratio matching each of operating regions of the engine is set. In a block 1212, an air-fuel ratio feedback control is performed based on the oxygen concentration sensor output and the target air-fuel ratio, and an air-fuel ratio feedback control coefficient is calculated. In a block 1213, a basic fuel is corrected based on the basic fuel correction coefficient, a fuel correction amount at the acceleration/deceleration determination, and the air-fuel ratio feedback control coefficient. In a block 1214, a basic ignition timing is subjected to a map searching, based on the engine speed and the engine load. In a block 1215, an acceleration/deceleration ignition timing correction amount of the basic ignition timing is calculated during acceleration. In a block 1216, acceleration/deceleration ignition timing correction is performed at the basic ignition timing. In a block 1217, intake and exhaust valve timings matching the respective operating ranges of the engine are set.

Figure 13:
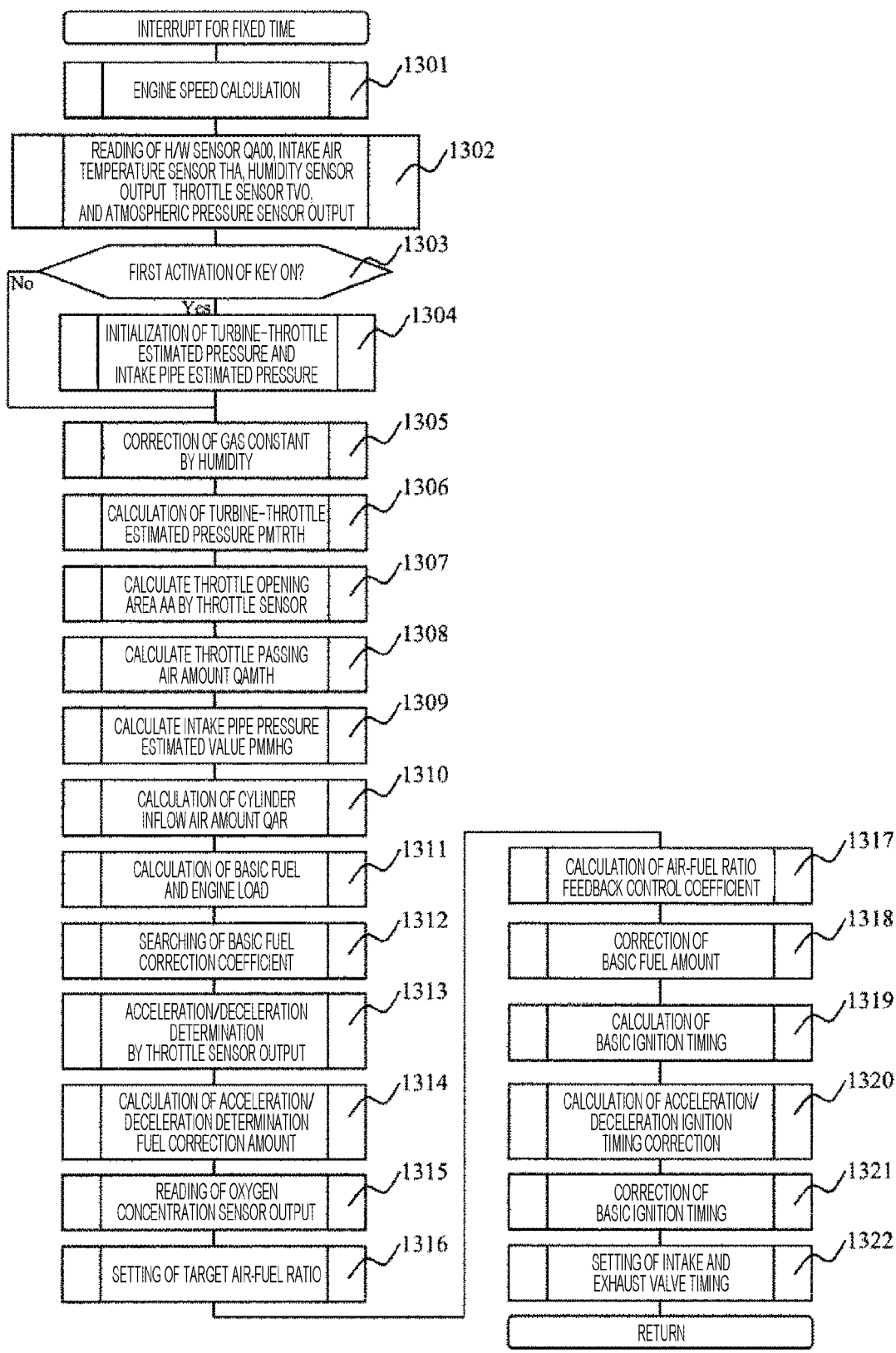
FIG. 13 is an example of a detailed flowchart of FIG. 3 of the control block of the engine control device including the method for calculating the intake pipe pressure of the engine according to the present invention.

FIG. 13 is an example of a detailed flowchart of FIG. 3 of the control block of the engine control device including the method for calculating the intake pipe pressure of the engine according to the present embodiment.

In a block 1301, an engine speed is calculated. In a block 1302, the outputs of the H/W sensor, the intake air temperature sensor, the humidity sensor, the throttle sensor, and the atmospheric pressure sensor are read. In a block 1303, it is determined whether or not this time is a first activation of an ignition key. In the first activation of an Ignition KEY, in a block 1304, the turbine-throttle calculated pressure and the intake pipe calculated pressure are initialized by the atmospheric pressure sensor output. In a block 1305, a gas constant is corrected by humidity. In a block 1306, a turbine-throttle calculated pressure is calculated. In a block 1307, a throttle opening area is calculated by the throttle sensor. In a block 1308, a throttle passing air flow rate is calculated.

In a block 1309, an intake pipe pressure calculation value is calculated. In a block 1310, the cylinder inflow air amount is calculated by the engine speed and the intake pipe pressure calculation value. In a block 1311, a basic fuel of the engine and an engine load are calculated based on the engine speed and the cylinder inflow air amount. In a block 1312, a basic fuel correction coefficient of the engine is subjected to a map searching based on the engine speed and the engine load. In a block 1313, acceleration/deceleration determination is made based on the throttle sensor output. In a block 1314, an acceleration/deceleration fuel correction amount is calculated based on the acceleration/deceleration determination value. In a block 1315, an oxygen concentration sensor output is read. In a block 1316, a target air-fuel ratio suitable for each operating region of the engine is subjected to a map searching, based on the engine speed and the engine load. In a block 1317, an air-fuel ratio feedback control coefficient is calculated, based on the target air-fuel ratio and the oxygen concentration sensor output. In a block 1318, a basic fuel is corrected based on the basic fuel correction coefficient, the acceleration/deceleration fuel correction amount, and the air-fuel ratio feedback control coefficient. In a block 1319, a basic ignition timing is subjected to a map searching suitable for each operating region of the engine, based on the engine speed and the engine load. In a block 1320, an acceleration/deceleration ignition timing correction amount is calculated by the acceleration/deceleration determination, and in a block 1321, the basic ignition timing is corrected. In a block 1322, intake and exhaust valve timings suitable for the respective operating ranges of the engine are set.

Figure 14:
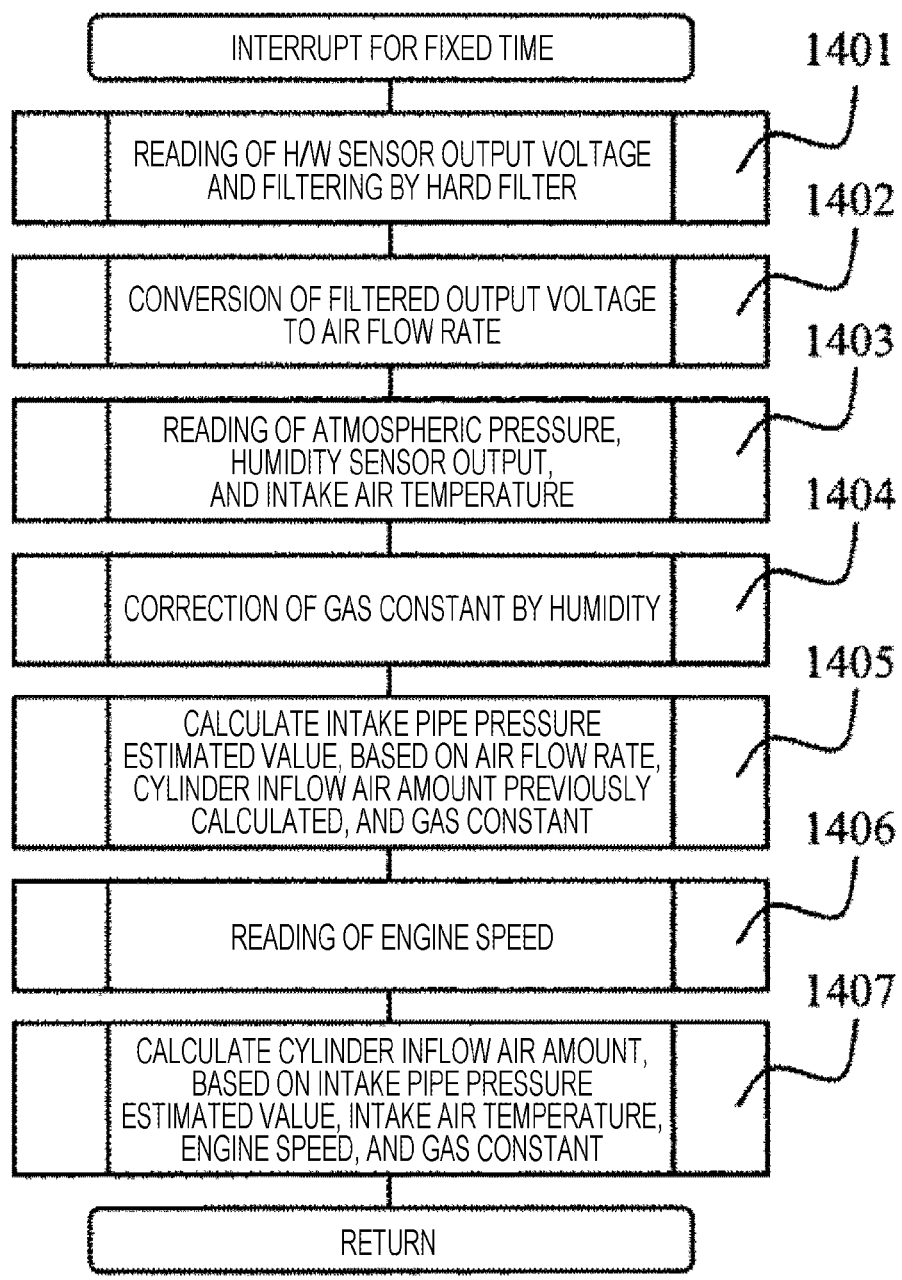
FIG. 14 is an example of a detailed flowchart of FIG. 6 of the control block of the engine control device including the method for calculating the intake pipe pressure of the engine according to the present invention.

FIG. 14 is an example of a detailed flowchart of FIG. 6 of the control block of the engine control device including the method for calculating the intake pipe pressure of the engine according to the present embodiment. In a block 1401, the output voltage of the H/W sensor is fetched and filtering by the hard filter is performed. In a block 1402, the previously filtered voltage is converted to an air flow rate. In a block 1403, outputs of the atmospheric pressure sensor, the humidity sensor, and the intake air temperature sensor are read. In a block 1404, a gas constant is corrected by humidity. In a block 1405, an intake pipe pressure calculation value is calculated based on the air flow rate, the cylinder inflow air amount previously calculated, and the corrected gas constant. In a block 1406, an engine speed is read. In a block 1407, a cylinder inflow air amount is calculated based on the intake pipe pressure calculation value, the intake air temperature, the engine speed, and the corrected gas constant.

Figure 15:
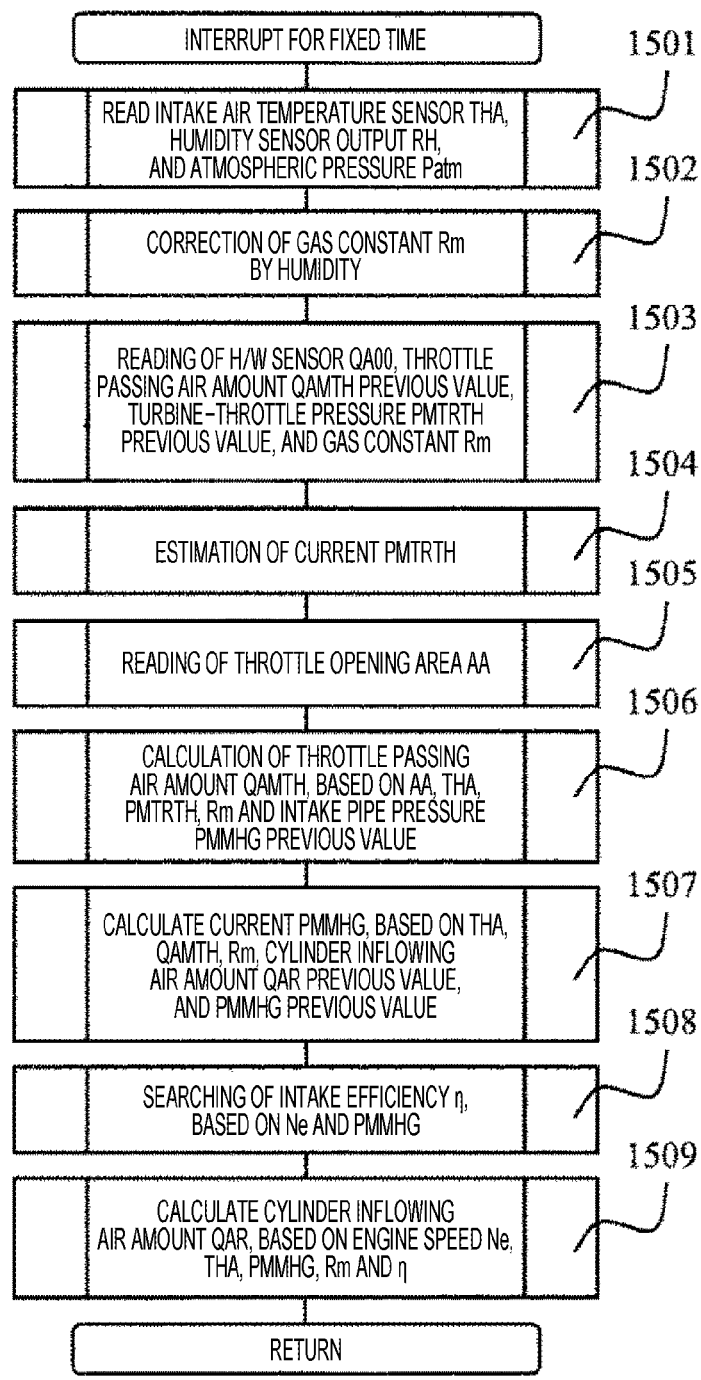
FIG. 15 is an example of a detailed flowchart of FIG. 7 of the control block of the engine control device including the method for calculating the intake pipe pressure of the engine according to the present invention.

FIG. 15 is an example of a detailed flowchart of FIG. 7 of the control block of the engine control device including the method for calculating the intake pipe pressure of the engine according to the present embodiment. In a block 1501, outputs of the intake air temperature sensor, the humidity sensor, and the atmospheric pressure sensor are read. In block 1502, a gas constant is corrected by humidity. In a block 1503, an H/W sensor output value, the previous value of the throttle passing air amount, the previous value of the turbine-throttle pressure, and the corrected gas constant are read, and in a block 1504, a current turbine-throttle pressure is calculated. In a block 1505, a throttle opening area is read. In a block 1506, a throttle passing air amount is calculated based on the throttle opening area, the intake air temperature, the current turbine-throttle pressure, the corrected gas constant, and the previous value of the intake pipe pressure. In a block 1507, a current intake pipe pressure calculation value is calculated based on the intake air temperature, the throttle passing air amount, the corrected gas constant, the previous value of the cylinder inflow air amount, and the previous intake pipe pressure calculation value. In a block 1508, an intake efficiency is subjected to a map searching, based on the engine speed and the intake pipe pressure calculation value. In a block 1509, a cylinder inflow air amount is calculated based on the engine speed, the intake air temperature, the intake pipe pressure calculation value, the corrected gas constant, and the intake efficiency.

Figure 16:
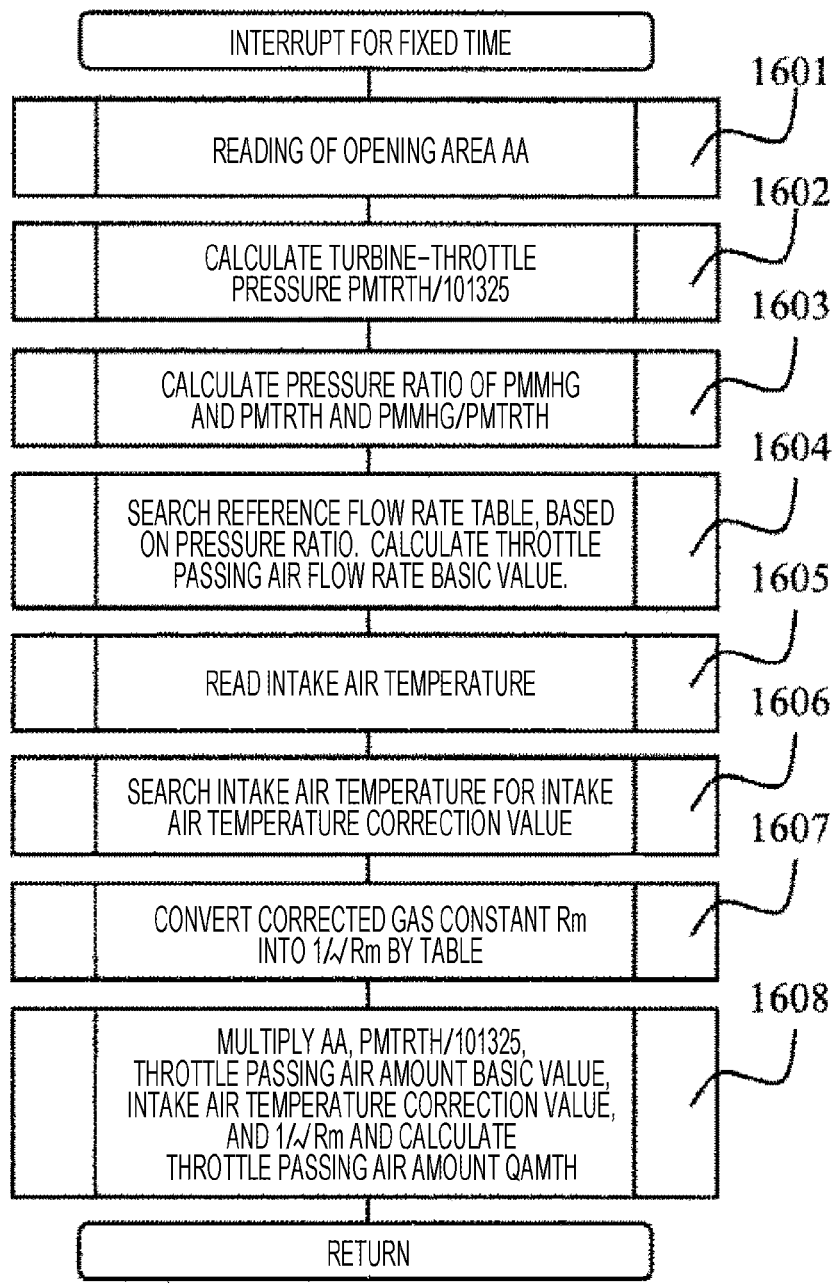
FIG. 16 is an example of a detailed flowchart of FIG. 8 of the control block of the engine control device including the method for calculating the intake pipe pressure of the engine according to the present invention.

FIG. 16 is an example of a detailed flowchart of FIG. 8 of the control block of the engine control device including the method for calculating the intake pipe pressure of the engine according to the present embodiment. In a block 1601, the opening area AA is read. In a block 1602, the turbine-throttle pressure PMTRTH is divided by 101325. In a block 1603, a pressure ratio PMMHG/PMTRTH of the intake-air calculated pressure PMMHG and the turbine-throttle pressure PMTRTH is calculated. In a block 1604, a reference flow rate table is searched from the pressure ratio and a throttle passing air amount basic value is calculated. In a block 1605, an intake air temperature is read. In a block 1506, an intake air temperature correction value is subjected to a table searching, based on the intake air temperature. In a block 1607, the corrected gas constant Rm is converted into $1/\sqrt{Rm}$ in a table. In a block 1608, the opening area AA, the PMTRTH/101325, the throttle passing air amount basic value, the intake air temperature correction value, and the 1/√Rm are multiplied, and the throttle passing air amount QAMTH is calculated. In the present embodiment, the throttle passing air amount QAMTH is calculated in combination with a table searching as described above, but it goes without saying that equation 3 may be directly calculated.

Figure 17:
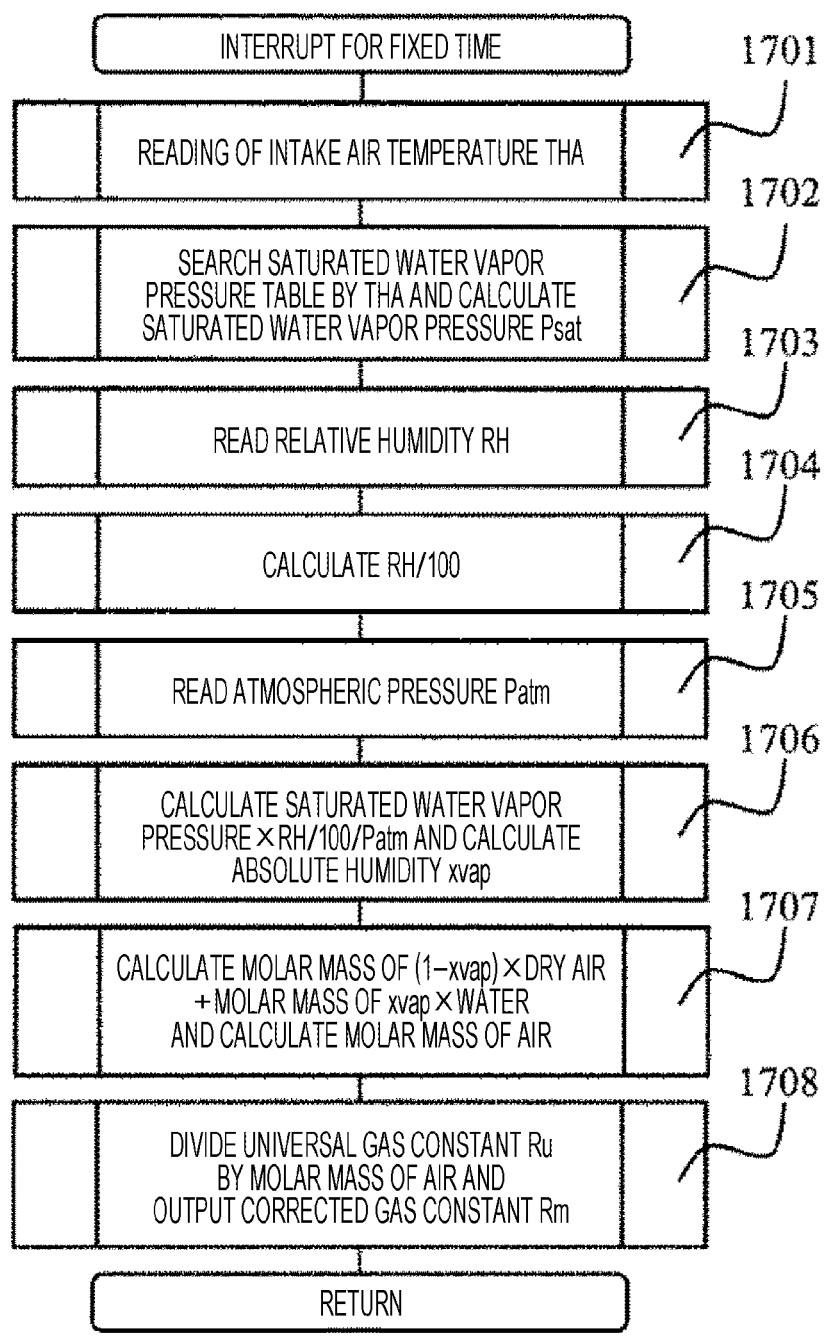
FIG. 17 is an example of a detailed flowchart of FIG. 9 of the control block of the engine control device including the method for calculating the intake pipe pressure of the engine according to the present invention.

FIG. 17 is an example of a detailed flowchart of FIG. 9 of the control block of the engine control device including the method for calculating the intake pipe pressure of the engine according to the present embodiment. In a block 1701, an intake air temperature THA is read. In a block 1702, a saturated water vapor pressure table is searched at the intake air temperature THA and a saturated water vapor pressure Psat is calculated. In a block 1703, a relative humidity RH is read. In a block 1704, a relative humidity RH/100 is calculated. In a block 1705, an atmospheric pressure Patm is read. In a block 1706, the saturated water vapor pressure Psat×the RH/100/the atmospheric pressure Patm is calculated, and an absolute humidity xvap is calculated. In a block 1707, (1−the absolute humidity xvap)×molar mass of dry air+the absolute humidity xvap×molar mass of water is calculated, and molar mass of air is output. In a block 1708, a universal gas constant Ru is divided by the molar mass of air, and a corrected gas constant Rm is output. Although the saturated water vapor pressure in this embodiment is obtained by a table searching based on the intake air temperature, the saturated water vapor pressure may be obtained by an approximation based on the intake air temperature.

According to the present embodiment, since the gas constant is corrected with respect to the humidity, the calculated pressure of the intake pipe can be calculated more accurately. It is also possible to improve the accuracy of calculating the EGR rate using the calculated pressure of the intake pipe.

REFERENCE SIGNS LIST

102 intake air amount calculation means
200 engine
201 H/W sensor
201_a humidity sensor
202 throttle throttle valve
203 atmospheric pressure sensor
204 intake pipe
205 pressure sensor
205_a intake air temperature sensor
206 fuel injection valve
214 engine control device
302 intake air amount calculation means
400 engine
401 H/W sensor
401_a humidity sensor
402 supercharger
403 throttle throttle valve
404 atmospheric pressure sensor
405 intake pipe
406 pressure sensor
406_a intake air temperature sensor
407 fuel injection valve
414 engine control device
501 CPU
502 I/O
503 intake air amount sensor
504 humidity sensor
505 intake pipe pressure sensor
506 intake air temperature sensor
513 output signal driver
605 correction block of gas constant by humidity
606 intake pipe pressure calculation block
607 cylinder inflow air amount operation block
701 correction block of gas constant by humidity
702 turbine-throttle pressure calculation block
703 throttle passing air amount calculation block
704 intake pipe pressure calculation block
705 intake efficiency operation block
706 cylinder inflow air amount operation block
1100 engine
1101 humidity sensor integrated H/W sensor
1102 intake pipe
1103 intake air temperature sensor integrated pressure sensor
1104 exhaust pipe
1105 EGR piping
1106 EGR valve
1107 EGR gas temperature sensor

The invention claimed is:

1. A control device configured to control an engine provided with an air amount sensor configured to measure an air amount passing through a throttle valve provided in an intake passage of the engine, and a humidity sensor configured to measure a humidity of air passing through the throttle valve, the control device comprising:
  a processor configured to:
    calculate an air amount flowing into a cylinder of the engine based on a measurement result of the air amount sensor;
    calculate a pressure of the intake manifold on a downstream side of the throttle valve based on the air amount measured by the air amount sensor, the air amount calculated by the processor, and the humidity measured by the humidity sensor; and
    correct a gas constant by using the humidity measured by the humidity sensor, wherein the calculating an air amount flowing into the cylinder of the engine uses the corrected gas constant.

2. The control device according to claim 1, wherein the air amount sensor is a thermal type air flow meter.

3. The control device according to claim 1, wherein the air amount sensor is configured to measure a humidity of an atmosphere.

4. The control device according to claim 1, wherein the air amount sensor is configured to measure a humidity of air in the intake manifold.

5. The control device according to claim 1, wherein the processor is configured to calculate the pressure of the intake manifold so that the pressure increases as the humidity measured by the humidity sensor increases.

6. The control device according to claim 1, wherein the processor is configured to calculate the pressure of the intake manifold so that the pressure decreases as the measured atmospheric pressure rises.

7. A control device configured to control an engine provided with a supercharger provided in an intake passage of the engine, an air amount sensor configured to measure an air amount flowing into the supercharger, and a humidity sensor configured to measure a humidity of air flowing into the supercharger, the control device comprising:
  a processor configured to:
    calculate an air amount passing through a throttle valve on a downstream side of the supercharger;
    calculate a pressure between the supercharger and the throttle valve on the downstream side of the supercharger based on the air amount measured by the air amount sensor, the air amount calculated by the processor, and the humidity measured by the humidity sensor; and correct a gas constant by using the humidity measured by the humidity sensor, wherein the calculating an air amount passing through the throttle valve on a downstream side of the supercharger uses the corrected gas constant.

8. The control device according to claim 7, wherein the processor is configured to calculate a pressure of an intake manifold on the downstream side of the throttle valve, based on the air amount passing through the throttle valve, the air amount being calculated by the processor, the pressure between the supercharger and the throttle valve on the downstream side of the supercharger, the pressure being calculated by the processor, and the humidity measured by the humidity sensor.

9. The control device according to claim 7, wherein the humidity sensor is configured to measure a humidity of air between the supercharger and the throttle valve on the downstream side of the supercharger.

10. The control device according to claim 9, wherein the humidity sensor is configured integrally with the air amount sensor.

11. The control device according to claim 7, wherein the air amount sensor is a thermal type air flow meter.

12. The control device according to claim 7, wherein the air amount sensor is configured to measure a humidity of an atmosphere.

13. The control device according to claim 7, wherein the air amount sensor is configured to measure a humidity of air in the intake manifold.

14. The control device according to claim 7, wherein the processor is configured to calculate the pressure of the intake manifold so that the pressure increases as the humidity measured by the humidity sensor increases.

15. The control device according to claim 7, wherein the processor is configured to calculate the pressure of the intake manifold so that the pressure decreases as the measured atmospheric pressure rises.

16. A control device configured to control an engine provided with a humidity sensor configured to measure a humidity of air passing through a throttle valve provided in an intake passage of an engine, a pressure sensor configured to measure a pressure of an intake manifold on a downstream side of the valve, and an exhaust gas recirculation (EGR) valve installed in a passage connecting an exhaust pipe of the engine and the intake pipe, the control device comprising:

a processor configured to:
calculate the pressure of the intake manifold using the humidity measured by the humidity sensor, and
control an EGR valve controller configured to control an opening degree of the EGR valve so that a difference between a detection value of the pressure sensor and the pressure calculated by the processor becomes a set value.

17. The control device according to claim 16, wherein the EGR valve controller is configured to control an opening degree of the EGR valve so as to change an exhaust gas recirculation amount of the passage connecting the exhaust pipe and the intake pipe when the humidity measured by the humidity sensor changes.

* * * * *